US011809031B2

(12) United States Patent
Abe et al.

(10) Patent No.: US 11,809,031 B2
(45) Date of Patent: Nov. 7, 2023

(54) DISPLAY DEVICE

(71) Applicant: Japan Display Inc., Tokyo (JP)

(72) Inventors: Hiroyuki Abe, Tokyo (JP); Kazune Matsumura, Tokyo (JP); Gen Koide, Tokyo (JP); Kentaro Agata, Tokyo (JP)

(73) Assignee: Japan Display Inc., Tokyo (JP)

( * ) Notice: Subject to any disclaimer, the term of this patent is extended or adjusted under 35 U.S.C. 154(b) by 492 days.

(21) Appl. No.: 17/190,647

(22) Filed: Mar. 3, 2021

(65) Prior Publication Data

US 2021/0181568 A1  Jun. 17, 2021

Related U.S. Application Data

(63) Continuation of application No. PCT/JP2019/031774, filed on Aug. 9, 2019.

(30) Foreign Application Priority Data

Sep. 4, 2018 (JP) .................. 2018-165505

(51) Int. Cl.
*G02F 1/1333* (2006.01)
*G02F 1/1362* (2006.01)
(Continued)

(52) U.S. Cl.
CPC ...... *G02F 1/133337* (2021.01); *G02F 1/1345* (2013.01); *G02F 1/13629* (2021.01);
(Continued)

(58) Field of Classification Search
CPC ........... G02F 1/133337; G02F 1/13629; G02F 1/1345; G02F 1/136209; G02F 1/13685;
(Continued)

(56) References Cited

U.S. PATENT DOCUMENTS

2013/0328051 A1  12/2013  Franklin et al.
2016/0091764 A1   3/2016  Asozu et al.
(Continued)

FOREIGN PATENT DOCUMENTS

CN    107783334 A    3/2018
JP    2016071228 A   5/2016
(Continued)

OTHER PUBLICATIONS

Japanese Office Action dated Aug. 23, 2022 in corresponding Japanese Application No. 2018-165505.
(Continued)

*Primary Examiner* — Nikolay K Yushin
(74) *Attorney, Agent, or Firm* — K&L Gates LLP

(57) ABSTRACT

A display device includes a substrate, a display region in which a plurality of pixels are provided on the substrate and that has a first side, a second side, a third side, a fourth side, and a plurality of curved portions, a peripheral region located between an end portion of the substrate and the display region, a plurality of scan lines extending in a first direction, a plurality of signal lines extending in a second direction, at least one gate driver arranged in the peripheral region and coupled to the scan lines, a signal line coupling circuit arranged in the peripheral region and coupled to the signal lines, a plurality of terminals aligned in the peripheral region, and a plurality of wiring lines coupling the terminals and the signal line coupling circuit.

12 Claims, 17 Drawing Sheets

(51) Int. Cl.
  *G02F 1/1345* (2006.01)
  *G02F 1/1368* (2006.01)
  *G02F 1/1343* (2006.01)

(52) U.S. Cl.
  CPC .... *G02F 1/136209* (2013.01); *G02F 1/13338* (2013.01); *G02F 1/13685* (2021.01); *G02F 1/134363* (2013.01); *G02F 2201/56* (2013.01)

(58) Field of Classification Search
  CPC ........... G02F 1/13338; G02F 1/134363; G02F 2201/56; G02F 2201/123; G02F 2201/121
  See application file for complete search history.

(56) References Cited

U.S. PATENT DOCUMENTS

| | | |
|---|---|---|
| 2018/0061925 A1 | 3/2018 | Miyanaga |
| 2018/0067356 A1 | 3/2018 | Katsuta |
| 2018/0129106 A1 | 5/2018 | Gao et al. |
| 2018/0217422 A1 | 8/2018 | Kojima et al. |
| 2018/0314122 A1 | 11/2018 | Saitoh et al. |

FOREIGN PATENT DOCUMENTS

| | | |
|---|---|---|
| JP | 2018036465 A | 3/2018 |
| JP | 2018040971 A | 3/2018 |
| JP | 2018124480 A | 8/2018 |
| WO | 2017077994 A1 | 5/2017 |

OTHER PUBLICATIONS

Indian Office Action dated Aug. 26, 2021 in corresponding Indian Application No. 202117013706.
International Search Report dated Sep. 17, 2019 in connection with PCT/JP2019/031774.

FIG.18
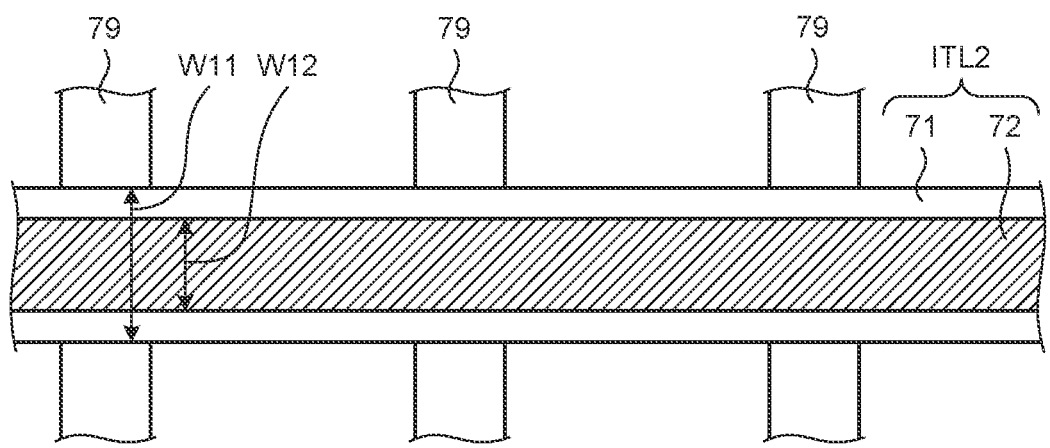
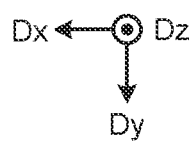

DISPLAY DEVICE

CROSS-REFERENCE TO RELATED APPLICATION

This application is a continuation of PCT International Patent Application No. PCT/JP2019/031774 filed on Aug. 9, 2019 which designates the United States, incorporated herein by reference, and which claims the benefit of priority from Japanese Patent Application No. 2018-165505 filed on Sep. 4, 2018, incorporated herein by reference.

BACKGROUND

1. Technical Field

The present disclosure relates to a display device.

2. Description of the Related Art

In a display device described in U.S. Patent Application Publication No. 2013/0328051, a display region has a curved surface shape other than a rectangular shape. The display device described in U.S. Patent Application Publication No. 2013/0328051 is also called an irregular shape display.

Japanese Patent Application Laid-open Publication No. 2018-036465 (JP-A-2018-036465) describes an ion trap electrode for retaining ionic impurities outside a display region.

An object of the present disclosure is to provide a display device including an ion trap electrode for retaining ionic impurities outside a display region having a partially curved shape.

SUMMARY

A display device according to one embodiment of the present disclosure includes a substrate, a display region in which a plurality of pixels are provided on the substrate and that has a first side, a second side, a third side, a fourth side, and a plurality of curved portions, a peripheral region located between an end portion of the substrate and the display region, a plurality of scan lines extending in a first direction, a plurality of signal lines extending in a second direction, at least one gate driver arranged in the peripheral region and coupled to the scan lines, a signal line coupling circuit arranged in the peripheral region and coupled to the signal lines, a plurality of terminals aligned in the peripheral region, and a plurality of wiring lines coupling the terminals and the signal line coupling circuit. An ion trap electrode to which a fixed potential is to be applied is provided between the gate driver and a wiring region in which the wiring lines are arranged around at least one of the curved portions.

A display device according to another embodiment of the present disclosure includes a substrate, a display region in which a plurality of pixels are provided on the substrate and that has a first side, a second side, a third side, and a fourth side, a peripheral region located between an end portion of the substrate and the display region, a plurality of scan lines extending in a first direction, a plurality of signal lines extending in a second direction, a signal line coupling circuit arranged in the peripheral region and coupled to the signal lines, and a plurality of terminals aligned in the peripheral region. A notch portion of the display region is provided in the first side adjacent to the terminals, the signal line coupling circuit is arranged along the first side and the notch portion, and an ion trap electrode to which a fixed potential is to be applied is provided between the display region and the signal line coupling circuit in the notch portion.

BRIEF DESCRIPTION OF THE DRAWINGS

FIG. 18 is a plan view illustrating an ion trap electrode in the second embodiment.

DETAILED DESCRIPTION

Figure 1:
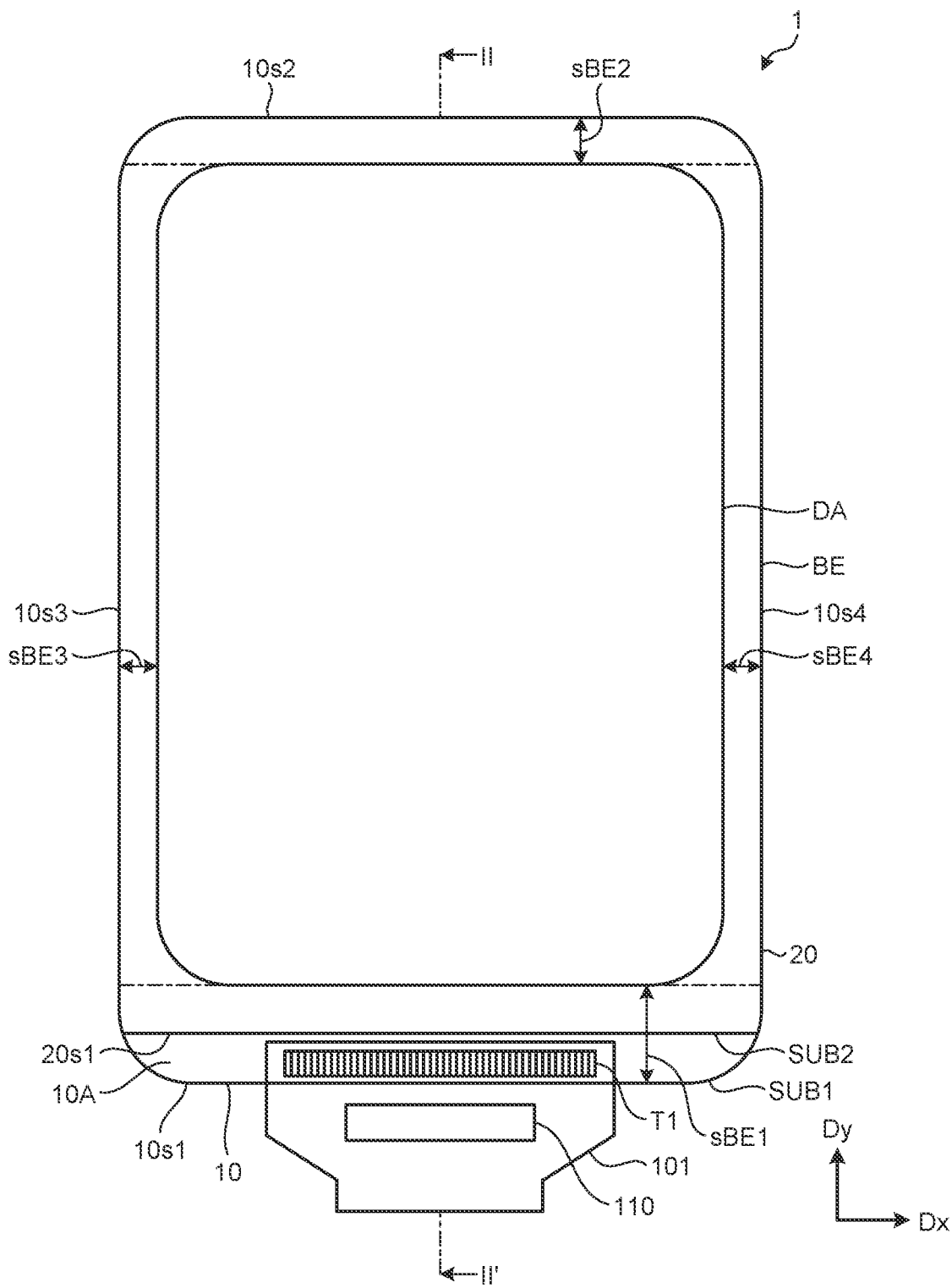
FIG. 1 is a plan view schematically illustrating a display device according to a first embodiment.

Modes for carrying out the present disclosure (embodiments) will be described in detail with reference to the drawings. Contents described in the following embodiments do not limit the present disclosure. Components described below include those that can be easily assumed by those skilled in the art and substantially the same components. Furthermore, the components described below can be appropriately combined. What is disclosed herein is merely an example, and it is needless to say that appropriate modifications within the gist of the invention of which those skilled in the art can easily conceive are encompassed in the range of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those described before with reference to the drawing that has been already referred, and detail explanation thereof can be appropriately omitted.

First Embodiment

Figure 2:
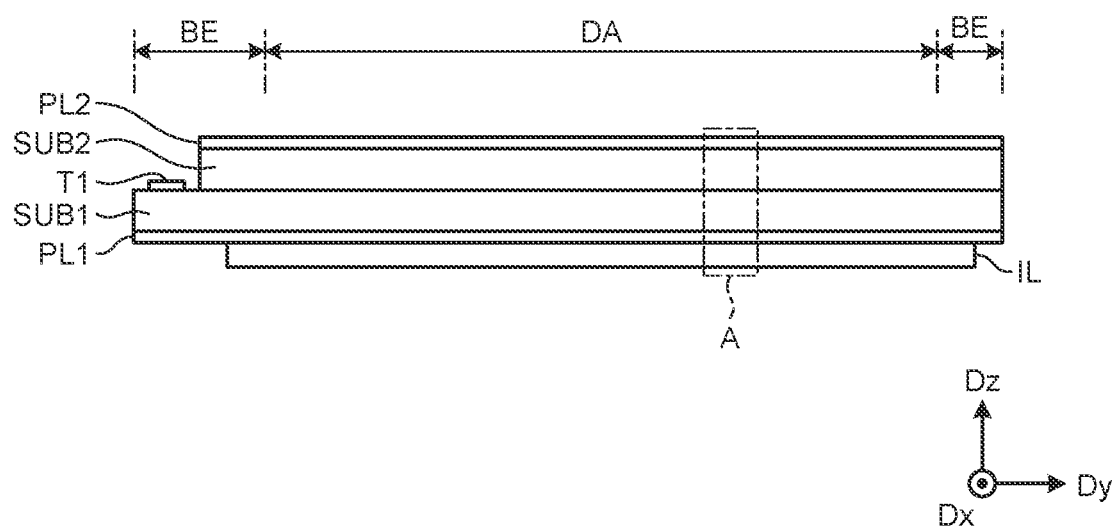
FIG. 2 is a cross-sectional view cut along line II-II' in FIG. 1.
Figure 3:
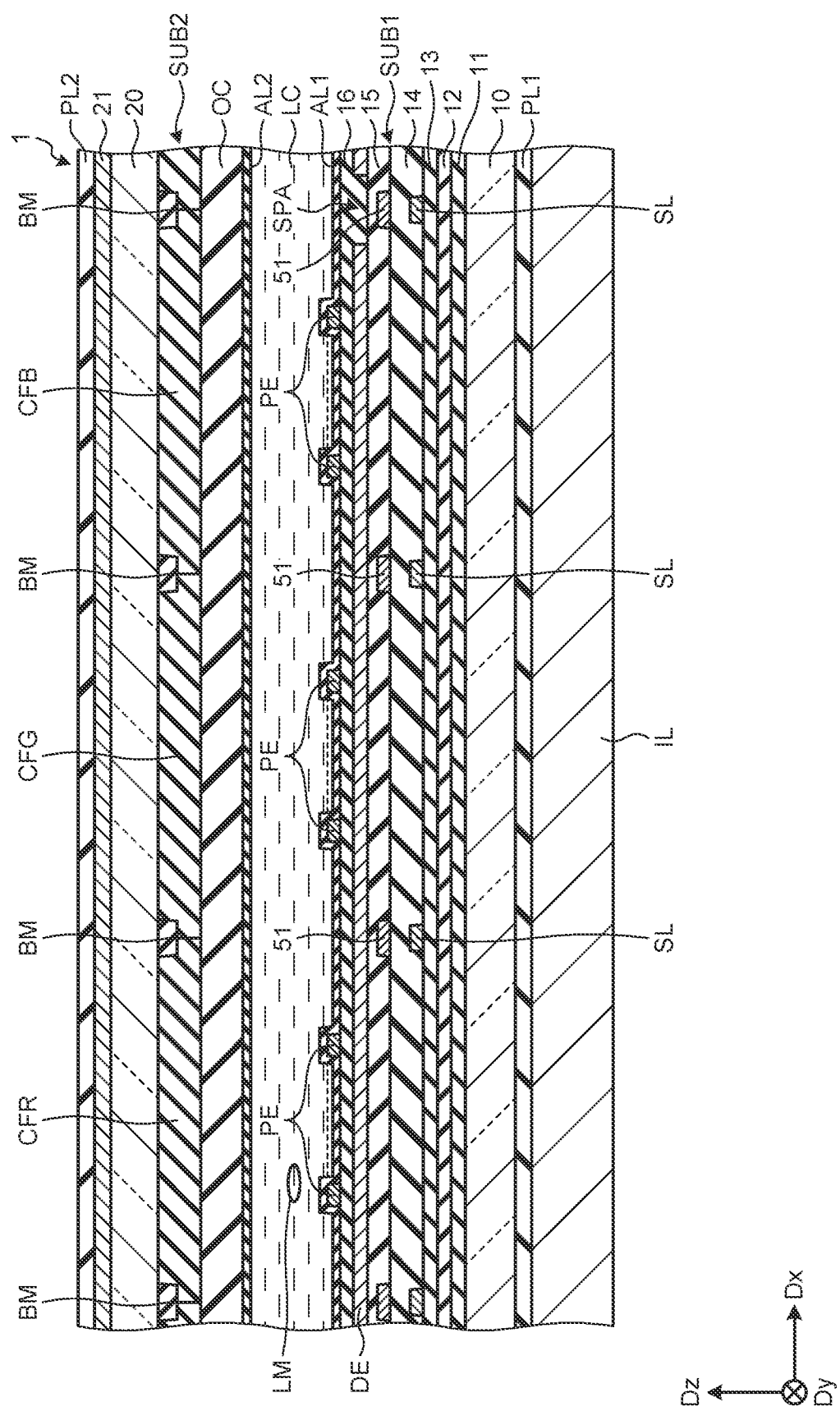
FIG. 3 is a cross-sectional view illustrating a region A in FIG. 2 in an enlarged manner.

FIG. 1 is a plan view schematically illustrating a display device according to a first embodiment. FIG. 2 is a cross-sectional view cut along line II-II' in FIG. 1. FIG. 3 is a cross-sectional view illustrating a region A in FIG. 2 in an enlarged manner. As illustrated in FIG. 1, a display device 1 includes an array substrate SUB1 and a counter substrate SUB2. A peripheral region BE is provided on the outer side of a display region DA in the display device 1. The display region DA is formed to have a substantially quadrangular shape with curved corner portions but the outer shape of the display region DA is not limited thereto. For example, the display region DA may have a cutout, the display region DA may have another polygonal shape, or the display region DA may have another shape such as a circular shape and an elliptic shape.

In the first embodiment, a first direction Dx is a direction along the short sides of the display region DA. A second direction Dy is a direction intersecting with (or orthogonal to) the first direction Dx. The second direction Dy is not limited thereto and may intersect with the first direction Dx at an angle other than 90°. A plane defined by the first direction Dx and the second direction Dy is parallel with a plane of the array substrate SUB1. A third direction Dz orthogonal to the first direction Dx and the second direction Dy corresponds to the thickness direction of the array substrate SUB1.

The display region DA is a region for displaying an image and is a region overlapping with a plurality of pixels Pix. The peripheral region BE indicates a region on the inner side of the outer circumference of the array substrate SUB1 and on the outer side of the display region DA. The peripheral region BE may have a frame shape surrounding the display region DA, and in this case, the peripheral region BE can also be referred to as a frame region.

A first insulating substrate 10 that the array substrate SUB1 includes has a first side 10s1, a second side 10s2, a third side 10s3, and a fourth side 10s4. The first side 10s1 extends along the first direction Dx when seen from above. The second side 10s2 faces the first side 10s1. The third side 10s3 extends along the second direction Dy. The fourth side 10s4 faces the third side 10s3.

The peripheral region BE has a first partial peripheral region sBE1, a second partial peripheral region sBE2, a third partial peripheral region sBE3, and a fourth partial peripheral region sBE4. In the first embodiment, the first partial peripheral region sBE1 is a region between the first side 10s1 and a virtual line (indicated by a two-dot chain line) provided by extending a straight line portion of the short side of the display region DA. The second partial peripheral region sBE2 is a region between the second side 10s2 and a virtual line provided by extending a straight line portion of the short side of the display region DA. The third partial peripheral region sBE3 and the fourth partial peripheral region sBE4 are regions between the first partial peripheral region sBE1 and the second partial peripheral region sBE2 and are provided along the third side 10s3 and the fourth side 10s4, respectively.

As illustrated in FIG. 1 and FIG. 2, the length of the array substrate SUB1 in the second direction Dy is larger than the length of the counter substrate SUB2 in the second direction Dy. As illustrated in FIG. 1, the first insulating substrate 10 has a first protruding portion 10A. The first protruding portion 10A is a portion protruding to the outer side relative to a first side 20s1 of a second insulating substrate 20 when seen from above.

A plurality of terminals T1 are provided in the first protruding portion 10A. The terminals T1 are aligned in the first direction Dx along the first side 10s1 in the first partial peripheral region sBE1. A wiring substrate 101 is provided in the first protruding portion 10A. The wiring substrate 101 is configured by a flexible printed circuit (FPC), for example. The wiring substrate 101 is coupled to the terminals T1 on the first insulating substrate 10 with a film on glass (FOG) using an anisotropic conductive film (ACF), for example (hereinafter, referred to as "FOG mounting"). Wiring lines on the first insulating substrate 10 and wiring lines on the wiring substrate 101 are thereby electrically coupled to each other.

A driver integrated circuit (IC) 110 is provided on the wiring substrate 101. The driver IC 110 includes a control circuit that controls display of the display device 1, a detection circuit, an analog front end, and the like. The driver IC 110 is mounted on the wiring substrate 101 by a chip on film (COF) using the ACF, for example (hereinafter, referred to as "COF mounting"). The driver IC 110 is not limited to this example and may be chip on glass (COG)-mounted on the first insulating substrate 10. In this case, the driver IC 110 is provided between the terminals T1 to which the wiring substrate 101 is coupled and signal line coupling circuits 30 (see FIG. 5). Arrangement of the driver IC 110 is not limited thereto, and the driver IC 110 may be provided on a control substrate or a flexible substrate outside the module, for example.

As illustrated in FIG. 2 and FIG. 3, the counter substrate SUB2 is arranged so as to face the surface of the array substrate SUB1 in the perpendicular direction. A liquid crystal layer LC is provided between the array substrate SUB1 and the counter substrate SUB2.

In FIG. 3, the array substrate SUB1 includes, as a base body, the first insulating substrate 10 having translucency, such as a glass substrate and a resin substrate. The array substrate SUB1 includes a first insulating film 11, a second insulating film 12, a third insulating film 13, a fourth insulating film 14, a fifth insulating film 15, a sixth insulating film 16, signal lines SL, pixel electrodes PE, detection electrodes DE, a first orientation film AL1, and the like on the side of the first insulating substrate 10 that faces the counter substrate SUB2.

In the present specification, the direction toward the second insulating substrate 20 from the first insulating substrate 10 in the direction perpendicular to the first insulating substrate 10 is an "upper-side direction" or simply an "upward direction". The direction toward the first insulating substrate 10 from the second insulating substrate 20 is a "lower-side direction" or simply a "downward direction". The expression "when seen from above" indicates the case when seen from the direction perpendicular to the first insulating substrate 10. The detection electrodes DE are also referred to as first electrodes, and the pixel electrodes PE are also referred to as second electrodes.

The first insulating film 11 is located above the first insulating substrate 10. The second insulating film 12 is located above the first insulating film 11. The third insulating film 13 is located above the second insulating film 12. The signal lines SL are located above the third insulating film 13. The fourth insulating film 14 is located above the third insulating film 13 and covers the signal lines SL.

Sensor wiring lines 51 are located above the fourth insulating film 14. The sensor wiring lines 51 face the signal lines SL with the fourth insulating film 14 interposed therebetween. That is to say, the sensor wiring lines 51 are superposed above the signal lines SL. The sensor wiring lines 51 are covered by the fifth insulating film 15. The first insulating film 11, the second insulating film 12, the third insulating film 13, and the sixth insulating film 16 are made of, for example, an inorganic material having translucency, such as silicon oxide and silicon nitride. The fourth insulating film 14 and the fifth insulating film 15 are made of a resin material having translucency and have film thicknesses that are larger than those of the other insulating films made of the inorganic material. It should be noted that the fifth insulating film 15 may be made of an inorganic material.

The detection electrodes DE are located above the fifth insulating film 15. The detection electrodes DE face the sensor wiring lines 51 with the fifth insulating film 15 interposed therebetween. Slits SPA of the detection electrodes DE are located just above the sensor wiring lines 51. The detection electrodes DE are covered by the sixth insulating film 16. The sixth insulating film 16 is formed by, for example, the inorganic material having translucency, such as silicon oxide and silicon nitride.

The pixel electrodes PE are located above the sixth insulating film 16 and face the detection electrodes DE with the sixth insulating film 16 interposed therebetween. The pixel electrodes PE and the detection electrodes DE are made of, for example, a conductive material having translucency, such as indium tin oxide (ITO) and indium zinc oxide (IZO). The pixel electrodes PE are covered by the first orientation film AL1. The first orientation film AL1 also covers the sixth insulating film 16.

The counter substrate SUB2 includes, as a base body, the second insulating substrate 20 having translucency, such as a glass substrate and a resin substrate. The counter substrate SUB2 includes a light shielding layer BM, color filters CFR, CFG, and CFB, an overcoat layer OC, and a second orientation film AL2, and the like on the side of the second insulating substrate 20 that faces the array substrate SUB1. The counter substrate SUB2 includes a conductive layer 21 on the side of the second insulating substrate 20 that is opposite to the array substrate SUB1.

The light shielding layer BM is located on the side of the second insulating substrate 20 that faces the array substrate SUB1. The light shielding layer BM defines openings that respectively face the pixel electrodes PE. The pixel electrodes PE are partitioned for the respective openings of pixels. The light shielding layer BM is made of a resin material in black color or a metal material having a light shielding property.

The color filters CFR, CFG, and CFB are located on the side of the second insulating substrate 20 that faces the array substrate SUB1, and end portions thereof overlap with the light shielding layer BM. As an example, the color filters CFR, CFG, and CFB are made of a resin material colored in red, green, and blue respectively.

The overcoat layer OC covers the color filters CFR, CFG, and CFB. The overcoat layer OC is made of a resin material having translucency. The second orientation film AL2 covers the overcoat layer OC. The first orientation film AL1 and the second orientation film AL2 are made of, for example, a material exhibiting horizontal orientation performance.

The array substrate SUB1 and the counter substrate SUB2 are arranged such that the first orientation film AL1 and the second orientation film AL2 face each other. The liquid crystal layer LC is enclosed between the first orientation film AL1 and the second orientation film AL2. The liquid crystal layer LC is made of a negative liquid crystal material having a negative dielectric anisotropy or a positive liquid crystal material having a positive dielectric anisotropy.

The array substrate SUB1 faces a backlight unit IL and the counter substrate SUB2 is located on the display surface side. Various modes can be applied to the backlight unit IL, and explanation of the detail configuration thereof is omitted.

The conductive layer 21 is provided above the second insulating substrate 20. The conductive layer 21 is made of a conductive material having translucency, such as ITO. Static electricity applied from the outside and static electricity charged to a polarizing plate PL2 flow through the conductive layer 21. The display device 1 can remove static electricity for a short period of time and can reduce static electricity that is applied to the liquid crystal layer LC as a display layer. The display device 1 can thereby improve ESD resistance.

An optical element including a polarizing plate PL1 is arranged on the outer surface of the first insulating substrate 10 or on the surface thereof facing the backlight unit IL. An optical element including the polarizing plate PL2 is arranged on the outer surface of the second insulating substrate 20 or on the surface thereof on an observation position side. A first polarization axis of the polarizing plate PL1 and a second polarization axis of the polarizing plate PL2 have a crossed nicol positional relation in an X-Y plane, for example. The optical elements including the polarizing plate PL1 and the polarizing plate PL2 may include another optical function element such as a phase difference plate.

For example, when the liquid crystal layer LC is made of the negative liquid crystal material and a state in which no voltage is applied to the liquid crystal layer LC is made, liquid crystal molecules LM are initially oriented in such a direction that long axes thereof are along the first direction Dx in the X-Y plane. On the other hand, in a state in which the voltage is applied to the liquid crystal layer LC, that is, in an ON state in which an electric field is formed between the pixel electrodes PE and the detection electrodes DE, the liquid crystal molecules LM receive influences of the electric field and orientation states thereof are changed. In the ON state, a polarization state of incident linearly polarized light is changed in accordance with the orientation states of the liquid crystal molecules LM when it passes through the liquid crystal layer LC.

Figure 4:
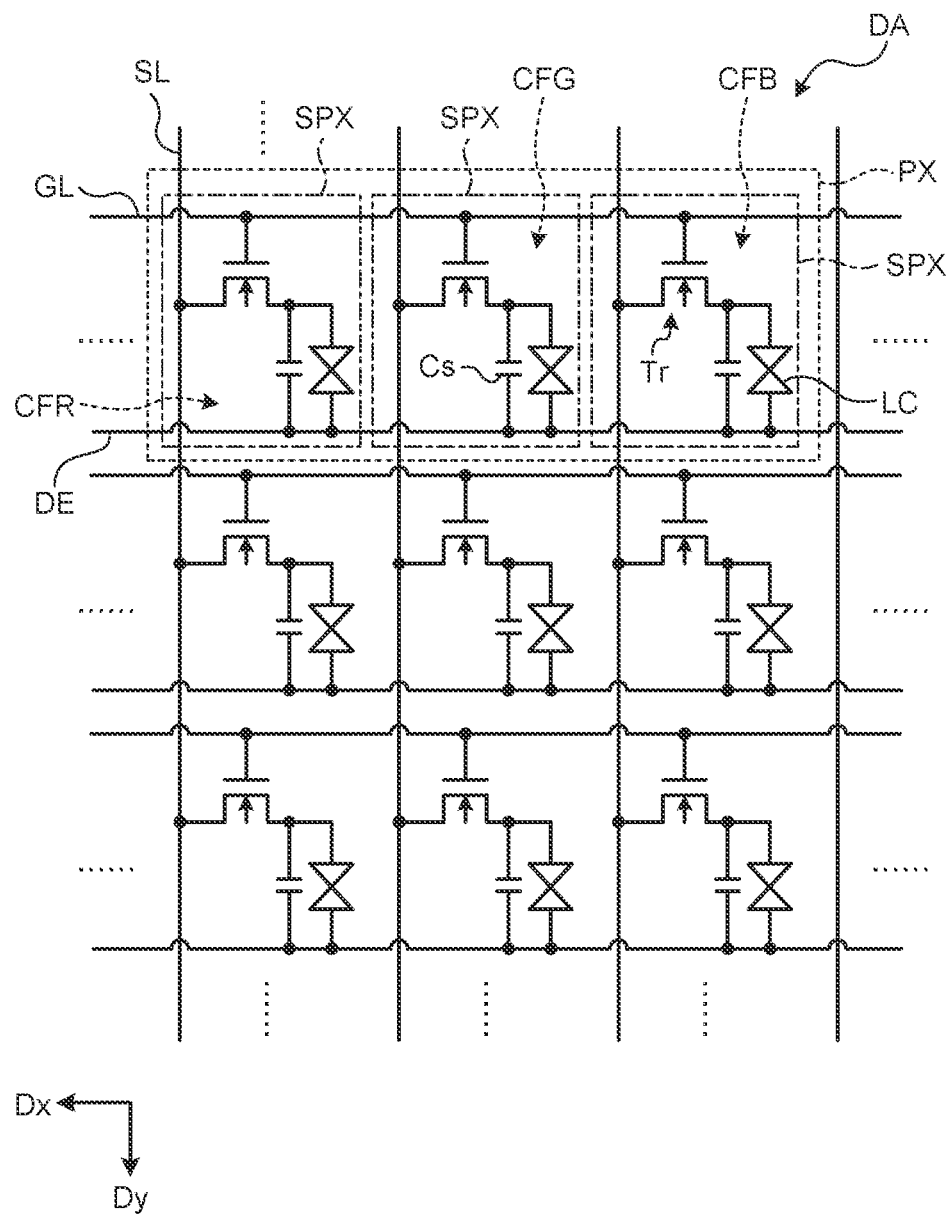
FIG. 4 is a circuit diagram illustrating a pixel array of a display region.

FIG. 4 is a circuit diagram illustrating a pixel array of the display region. Switching elements Tr of respective subpixels SPX, the signal lines SL, the scan lines GL and the like illustrated in FIG. 4, are formed on the array substrate SUB1. The signal lines SL extend in the second direction Dy. The signal lines SL are wiring lines for supplying pixel signals to the pixel electrodes PE (see FIG. 3). The scan lines GL extend in the first direction Dx. The scan lines GL are wiring lines for supplying gate signals (scan signals) for driving the switching elements Tr.

Each pixel PX includes the subpixels SPX. Each subpixel SPX includes the switching element Tr and capacitance of the liquid crystal layer LC. The switching element Tr is formed by a thin film transistor and, in this example, is formed by an n-channel metal oxide semiconductor (MOS)-type TFT. The sixth insulating film 16 is provided between the pixel electrodes PE and the detection electrodes DE illustrated in FIG. 3, and they form holding capacitors Cs illustrated in FIG. 4.

Color regions colored in three colors of red (R), green (G), and blue (B), for example, are periodically arrayed as the color filters CFR, CFG, and CFB illustrated in FIG. 3. The color regions of the three colors of R, G, and B as one set are made to respectively correspond to the subpixels SPX. A set of subpixels SPX corresponding to the color regions of the three colors configures the pixel PX. The color filters may include color regions of equal to or more than four colors. In this case, the pixel PX may include equal to or more than four subpixels SPX.

Figure 5:
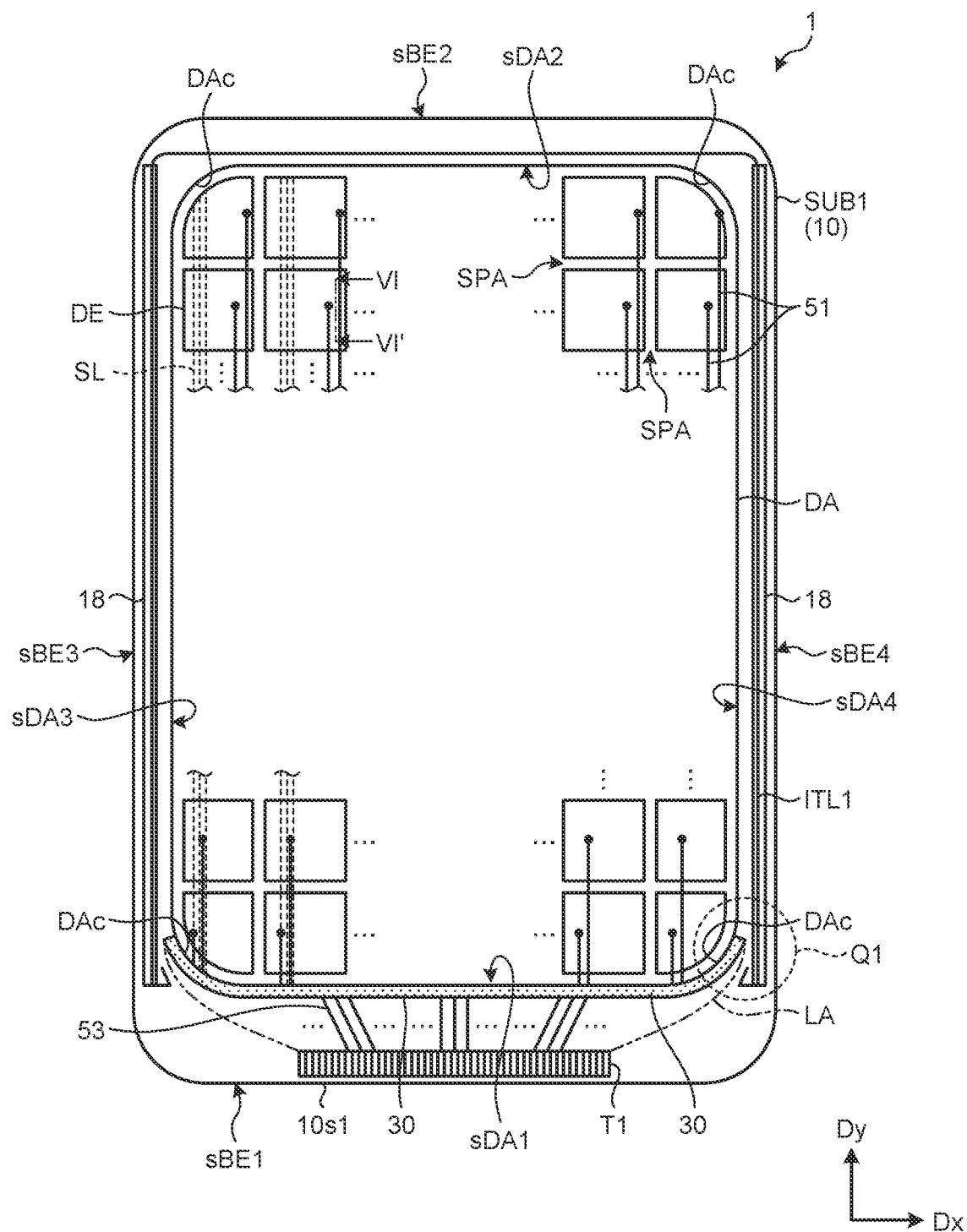
FIG. 5 is a plan view schematically illustrating an array substrate in the first embodiment.
Figure 6:
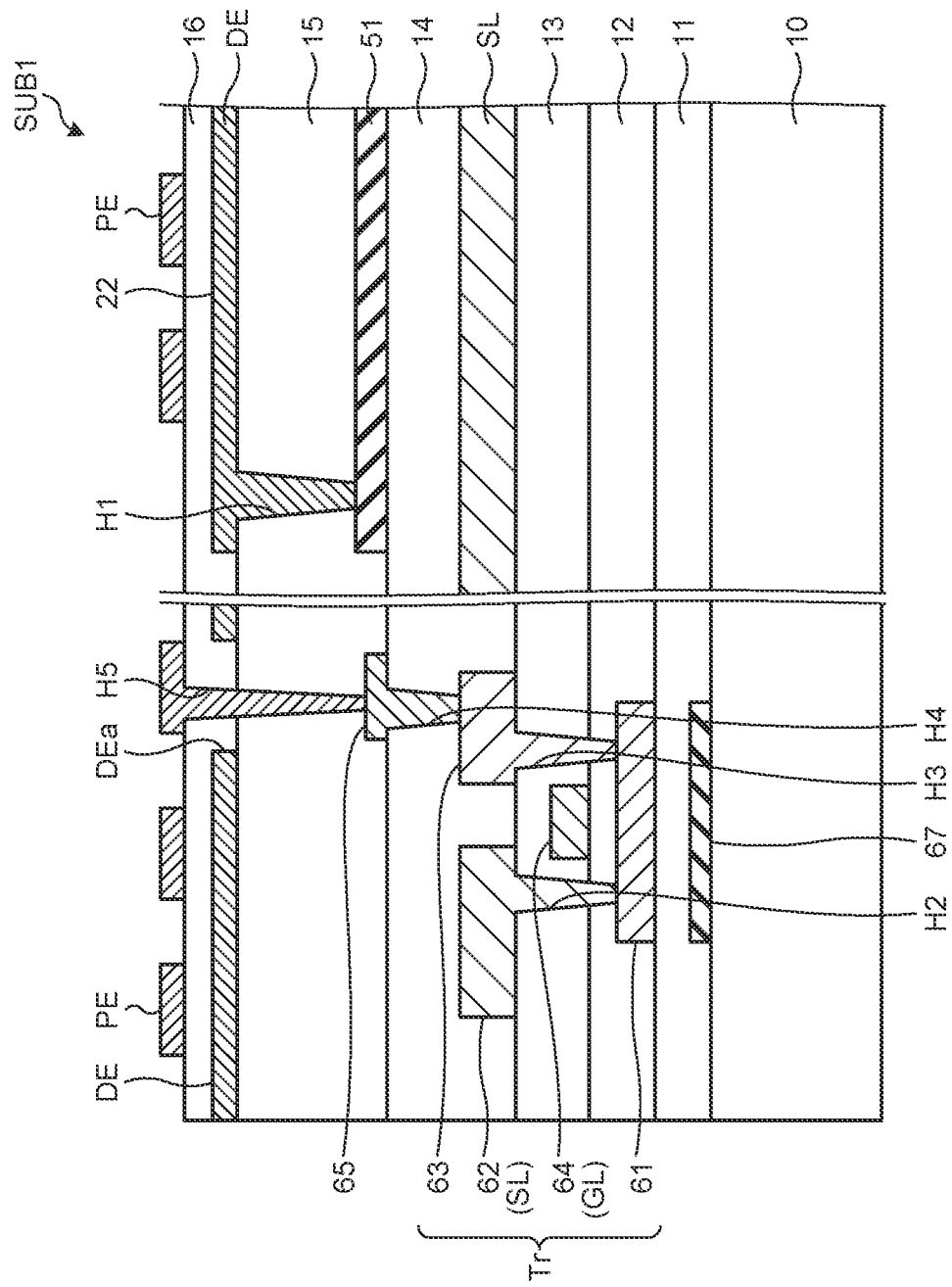
FIG. 6 is a cross-sectional view cut along line VI-VI' in FIG. 5.

FIG. 5 is a plan view schematically illustrating the array substrate. FIG. 6 is a cross-sectional view cut along line VI-VI' in FIG. 5. FIG. 6 schematically illustrates also a multilayered structure of the switching element Tr included in the subpixel SPX. The display region DA for displaying the image includes a sensor region included in a detection device that detects electrostatic capacitance. As illustrated in FIG. 5, the detection electrodes DE are arrayed in a matrix with a row-column configuration in the first direction Dx and the second direction Dy in the display region DA. The detection electrodes DE are divided in the first direction Dx and the second direction Dy by the slits SPA. Although the detection electrodes DE are schematically illustrated to have rectangular shapes or square shapes when seen from above, they are not limited thereto and may have polygonal shapes, parallelogram shapes, or irregular shapes with cutouts, or the like. The detection electrodes DE are made of, for example, a conductive material having translucency, such as ITO.

The display device 1 further includes the signal line coupling circuits 30, a wiring region LA including a plurality of wiring lines 53, and gate drivers 18. The signal line coupling circuits 30 include a plurality of analog switch elements and are also referred to as a multiplexer. The signal line coupling circuits 30 and the wiring region LA are provided in the first partial peripheral region sBE1 of the first insulating substrate 10. The terminals T1, the wiring region LA (wiring lines 53), the signal line coupling circuits 30, and the signal lines SL are coupled in this order toward the display region DA from the first side 10s1. The two gate drivers 18 are respectively provided in the third partial peripheral region sBE3 and the fourth partial peripheral region sBE4. In other words, the two gate drivers 18 are respectively arranged along the third side sDA3 and the fourth side sDA4 of the display region DA. The gate driver 18 may be provided in only one of the third partial peripheral region sBE3 and the fourth partial peripheral region sBE4.

The sensor wiring lines 51 are electrically coupled to the detection electrodes DE, respectively, and are led out to the peripheral area BE. Each of the sensor wiring lines 51 extends along the second direction Dy, and the sensor wiring lines 51 are arranged side by side in the first direction Dx. One ends of the sensor wiring lines 51 are coupled to the detection electrodes DE and the other ends thereof are electrically coupled to the signal line coupling circuits 30. The other ends of the sensor wiring lines 51 are coupled to the terminals T1 through the wiring lines 53. The detection electrodes DE are thus electrically coupled to the driver IC 110 (see FIG. 1).

The driver IC 110 supplies display drive signals to the sensor wiring lines 51 through the wiring lines 53 in display. The detection electrodes DE receive the display drive signals in display and function as common electrodes to the pixel electrodes PE. All the detection electrodes DE are at a common potential in a display period. The driver IC 110 supplies touch drive signals for detection to the detection electrodes DE through the sensor wiring lines 51 in touch detection. Detection signals in accordance with changes in the capacitance of the detection electrodes DE are supplied to the detection circuit of the driver IC 110 through the wiring lines 53. The display device 1 can thereby detect an object to be detected in a contact state or a proximity state for each of the detection electrodes DE.

The pixel electrodes PE (see FIG. 3) are electrically coupled to the driver IC 110 through the signal lines SL and the signal line coupling circuits 30. The signal lines SL are electrically coupled to the pixel electrodes PE aligned in the first direction Dx, respectively, and are led out to the peripheral region BE. Each of the signal lines SL extends along the second direction Dy, and the signal lines SL are arranged side by side in the first direction Dx. FIG. 5 illustrates only some of the signal lines SL and the sensor wiring lines 51 for making the drawing easy to view.

As illustrated in FIG. 5, the display region DA has a rectangular shape with a first side sDA1, a second side sDA2, a third side sDA3, and a fourth side sDA4. The first side sDA1, the second side sDA2, the third side sDA3, and the fourth side sDA4 are continuously coupled with curved portions DAc. The third side sDA3 faces the fourth side sDA4, and the second side sDA2 faces the first side sDA1.

An ion trap electrode ITL1 is arranged in the second partial peripheral region sBE2, the third partial peripheral region sBE3, and the fourth partial peripheral region sBE4 so as to be along the second side sDA2, the third side sDA3, and the fourth side sDA4. The ion trap electrode ITL1 extends and is continuously coupled so as to be along the second side sDA2, the third side sDA3, and the fourth side sDA4. The display region DA is therefore located on the inner side of the ion trap electrode ITL1.

The ion trap electrode ITL1 is arranged between one gate driver 18 and the third side sDA3 in the third partial peripheral region sBE3. The ion trap electrode ITL1 is arranged between the other gate driver 18 and the fourth side sDA4 in the fourth partial peripheral region sBE4.

The signal line coupling circuits 30 are provided along the boundary between the display region DA and the first partial peripheral region sBE1 and are provided along the curved portions DAc of the display region DA. End portions of the gate drivers 18 on the first partial peripheral region sBE1 side are provided so as to be adjacent to the curved portions DAc in the first direction Dx. Portions of the signal line coupling circuits 30 that are along the curved portions DAc are provided between the gate drivers 18 and the curved portions DAc in the first direction Dx. The signal lines SL are coupled to the signal line coupling circuits 30. The signal line coupling circuits 30 are electrically coupled to the wiring substrate 101 (see FIG. 1) through the wiring lines 53 provided in the wiring region LA and the terminals T1. The signal line coupling circuits 30 are circuits that switch coupling and interruption between the signal lines SL and the wiring lines 53.

The liquid crystal layer LC is enclosed between the array substrate SUB1 and the counter substrate SUB2 by sealing normally. Entrance of impurities such as metal ions, inorganic anions, and organic acid into the liquid crystal layer LC in the display region DA from the outside inhibits maintenance of an appropriate electric field due to these impurities and can cause display failures such as display speckles and burning. The ion trap electrode ITL1 is fixed at a fixed VGL potential with a low voltage that is used for a control signal in order to prevent the display failures. The ion trap electrode ITL1 thereby retains ionic impurities in the peripheral region BE so as to prevent them from entering the liquid crystal layer LC in the display region DA.

The present disclosures have found that the ionic impurities have a property of gathering around the curved portion DAc.

In view of the above-mentioned property, the ion trap electrode ITL1 is arranged between the gate driver 18 and the wiring lines 53 provided in the wiring region LA in a region Q1 in FIG. 5 that is adjacent to the curved portion DAc. The ion trap electrode ITL1 can thereby prevent the ionic impurities gathering around the curved portion DAc from entering the liquid crystal layer LC in the display region DA.

As illustrated in FIG. 6, each switching element Tr includes a semiconductor 61, a source electrode 62, a drain electrode 63, and a gate electrode 64. The semiconductors 61 are provided above the first insulating substrate 10 with the first insulating film 11 interposed therebetween. A light shielding layer 67 is provided between the first insulating substrate 10 and the semiconductors 61 in the direction perpendicular to the first insulating substrate 10.

The second insulating film 12 covers the semiconductors 61 and is provided above the first insulating film 11. The gate electrodes 64 are provided above the second insulating film 12. The gate electrodes 64 are portions of the scan lines GL that overlap with the semiconductors 61. The third insulating film 13 covers the semiconductors 61 and is provided above the second insulating film 12. Channel regions are formed in portions of the semiconductors 61 that overlap with the gate electrodes 64.

In the example illustrated in FIG. 6, the switching elements Tr have what is called a top gate structure. It should be noted that the switching elements Tr may have a bottom gate structure in which the gate electrodes 64 are provided under the semiconductors 61. The switching elements Tr may have a dual gate structure in which the gate electrodes 64 are provided with the semiconductors 61 interposed therebetween in the direction perpendicular to the first insulating substrate 10.

The source electrodes 62 and the drain electrodes 63 are provided above the third insulating film 13. In the first embodiment, the source electrodes 62 are electrically coupled to the semiconductors 61 through contact holes H2. The drain electrodes 63 are electrically coupled to the semiconductors 61 through contact holes H3. The source electrodes 62 are portions of the signal lines SL that overlap with the semiconductors 61.

The fourth insulating film 14 and the fifth insulating film 15 cover the source electrodes 62 and the drain electrodes 63 and are provided above the third insulating film 13. Relay electrodes 65 and the sensor wiring lines 51 are provided above the fourth insulating film 14. The relay electrodes 65 are electrically coupled to the drain electrodes 63 through contact holes H4. The sensor wiring lines 51 are provided on the upper side of the signal lines SL. The sensor wiring lines 51 respectively overlap with the signal lines SL and extend in parallel with the signal lines SL when seen from above. The detection electrodes DE are provided above the fifth insulating film 15. The detection electrodes DE are electrically coupled to the sensor wiring lines 51 through contact holes H1.

The pixel electrodes PE are electrically coupled to the relay electrodes 65 through contact holes H5 provided in the sixth insulating film 16 and the fifth insulating film 15. The contact holes H5 are formed at positions overlapping with openings DEa of the detection electrodes DE. With the above-mentioned configuration, the pixel electrodes PE are coupled to the switching elements Tr.

Figure 7:
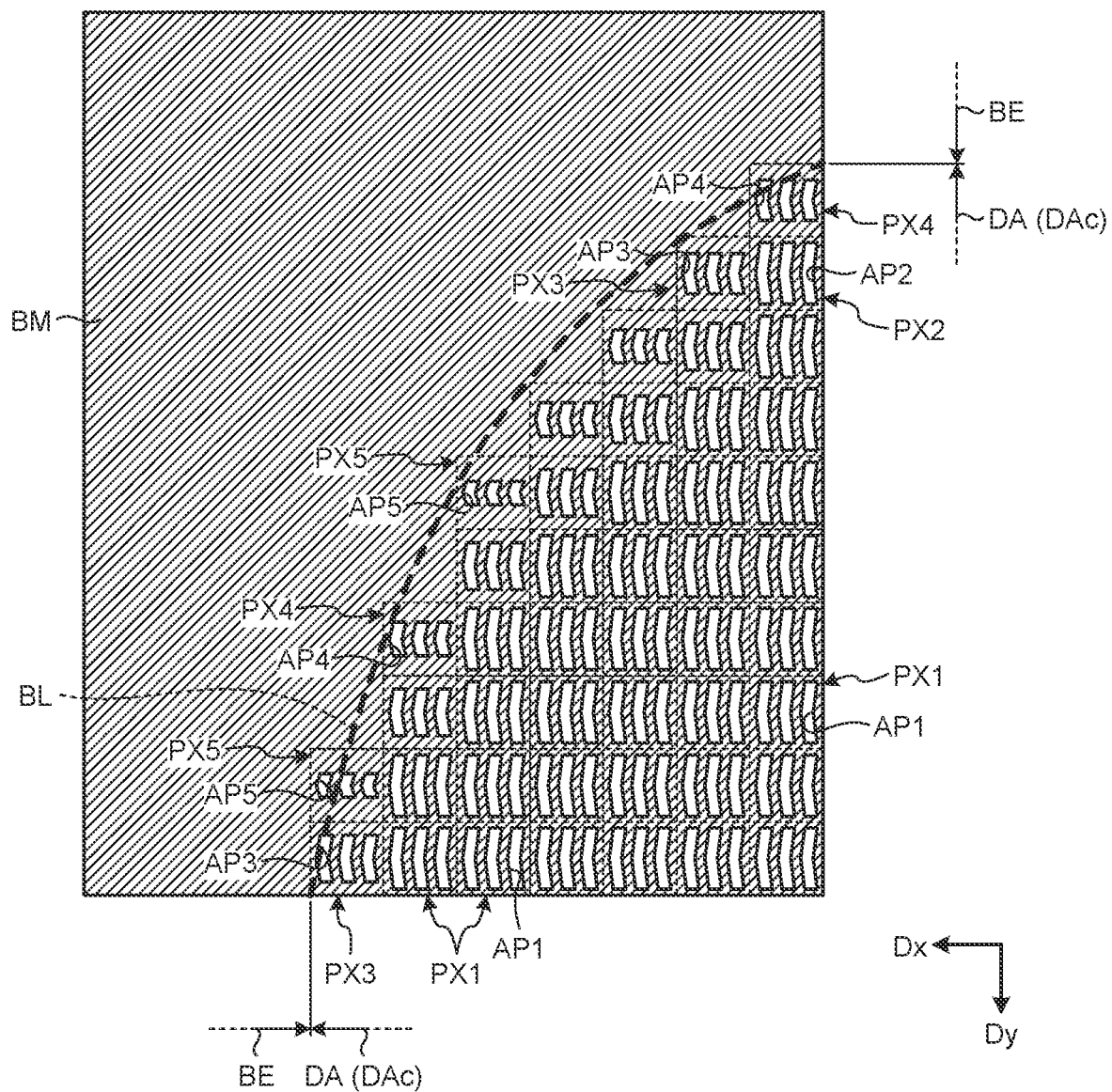
FIG. 7 is a plan view illustrating an example of a light shielding layer in the first embodiment.

FIG. 7 is a plan view illustrating an example of the light shielding layer in the first embodiment. Boundary lines BL in the curved portions DAc are formed between the display region DA and the peripheral region BE by providing difference in aperture ratio of the light shielding layer BM per unit area in the first embodiment.

For example, the display region DA has first pixels PX1, second pixels PX2, third pixels PX3, fourth pixels PX4, and fifth pixels PX5 as the pixels PX. The aperture ratio of the light shielding layer BM per unit area is different among the first pixels PX1, the second pixels PX2, the third pixels PX3, the fourth pixels PX4, and the fifth pixels PX5.

The light shielding layer BM at positions overlapping with the first pixels PX1 has three first openings AP1. The light shielding layer BM at positions overlapping with the second pixels PX2 has three second openings AP2. The light shielding layer BM at positions overlapping with the third pixels PX3 has three third openings AP3. The light shielding layer BM at positions overlapping with the fourth pixels PX4 has three fourth openings AP4. The light shielding layer BM at positions overlapping with the fifth pixels PX5 has three fifth openings AP5.

The area of the openings (that is, aperture ratio) is decreased in the order of the first openings AP1, the second openings AP2, the third openings AP3, the fourth openings AP4, and the fifth openings AP5. The opening area of the first openings AP1 is the largest, and the opening area of the fifth openings AP5 is the smallest. Light transmittance is thereby decreased in the order of the first pixels PX1, the second pixels PX2, the third pixels PX3, the fourth pixels PX4, and the fifth pixels PX5.

In the first embodiment, the first openings AP1, the second openings AP2, the third openings AP3, the fourth openings AP4, and the fifth openings AP5 are arranged such that the light transmittance is decreased toward the peripheral region BE from the display region DA in the first direction Dx and the second direction Dy. The light shielding layer BM thus defines the boundary lines BL in the curved portions DAc.

Figure 8:
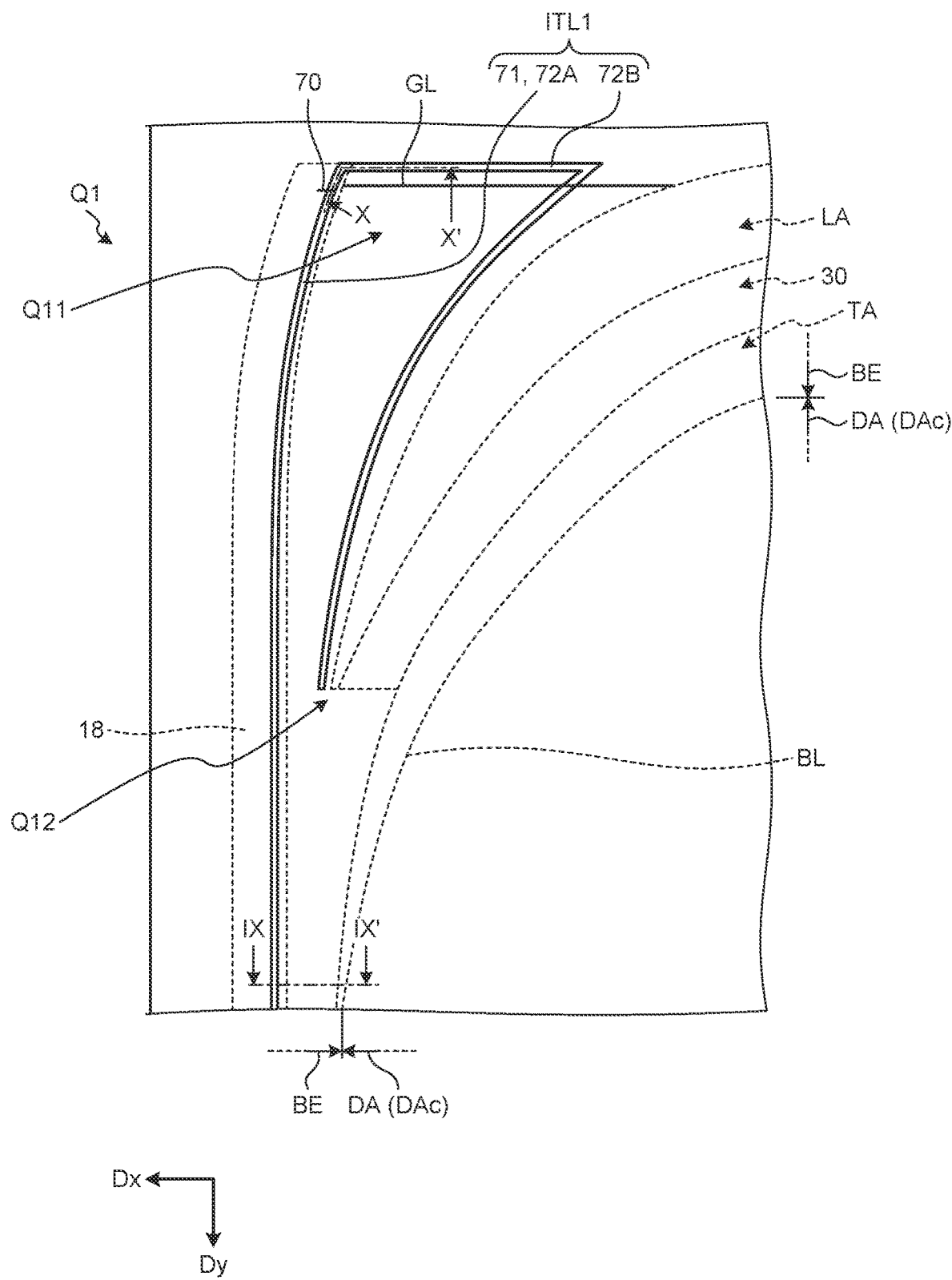
FIG. 8 is a plan view illustrating an ion trap electrode arranged so as to be adjacent to the display region in a curved corner portion.

Next, details of the configuration of the ion trap electrode ITL1 in the first embodiment are described. FIG. 8 is a plan view illustrating the ion trap electrode arranged so as to be adjacent to the display region in the curved corner portion. Although not illustrated in FIG. 5, as illustrated in FIG. 8, a wiring region TA including the sensor wiring lines 51 (see FIG. 5) is formed on the outer side of the boundary line BL in the curved portion DAc in the region Q1.

An arrangement region of the signal line coupling circuits 30 is formed on the outer side of the wiring region TA. The wiring region LA is formed on the outer side of the arrangement region of the signal line coupling circuits 30.

A distance between the gate driver 18 and the wiring region LA is increased toward one direction of the second direction Dy. The ion trap electrode ITL1 includes a first conductive layer 71, a second conductive layer 72A, and a second conductive layer 72B. The second conductive layer 72A and the second conductive layer 72B are arranged on the liquid crystal layer LC side (see FIG. 3) of the first conductive layer 71.

Figure 9:
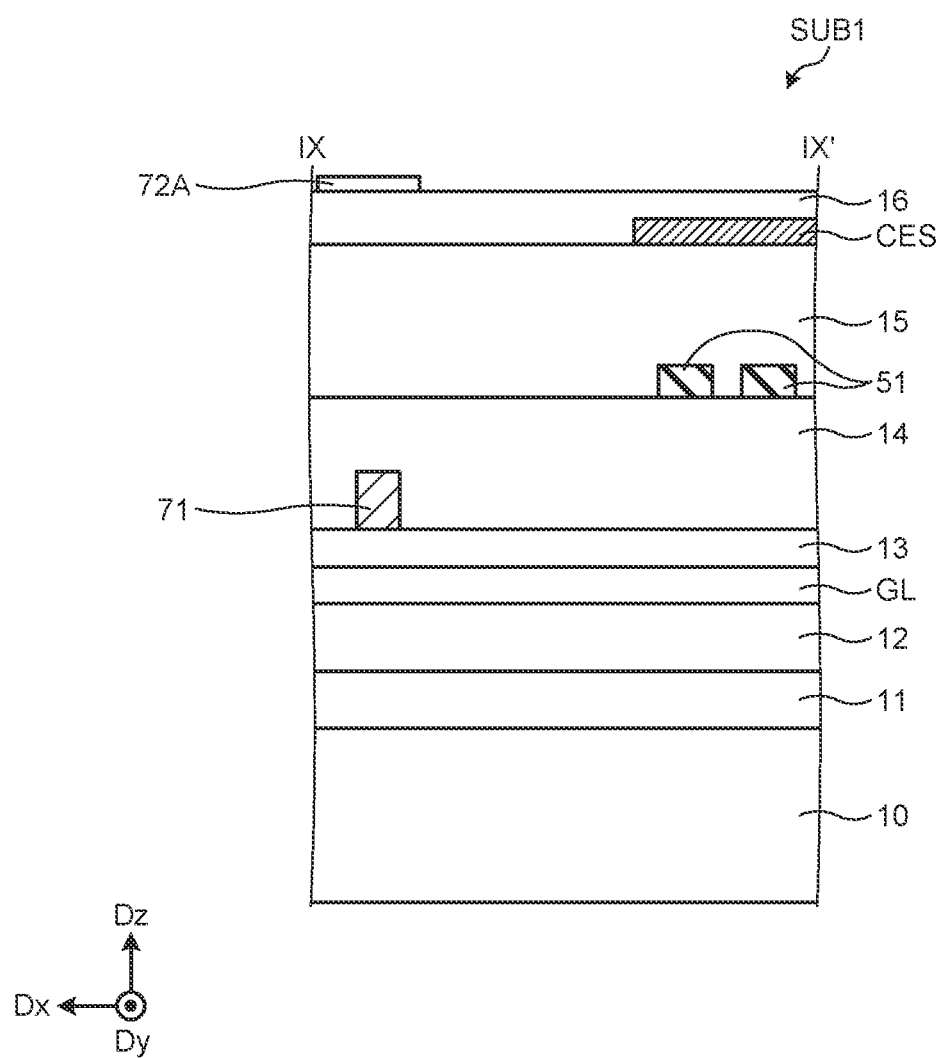
FIG. 9 is a cross-sectional view cut along line IX-IX' in FIG. 8.

FIG. 9 is a cross-sectional view cut along line IX-IX' in FIG. 8. The first conductive layer 71 illustrated in FIG. 9 is formed in the same layer as the signal lines SL, the source electrodes 62, and the drain electrodes 63 illustrated in FIG. 6 are, and is made of the same material. The first conductive layer 71 is arranged at a position that does not overlap with the sensor wiring lines 51 when seen from above. A low voltage (VGL) is supplied to the first conductive layer 71. The second conductive layer 72A is located so as to overlap with the first conductive layer 71 with the fourth insulating film 14 and the fifth insulating film 15 interposed therebetween. The second conductive layer 72A is provided above the sixth insulating film 16. The second conductive layer 72A is formed in the same layer as the pixel electrodes PE (see FIG. 3) is and is made of the same material.

As will be described later, the second conductive layer 72A is electrically coupled to the first conductive layer 71. To be more specific, the first conductive layer 71 is coupled to the gate driver 18 and is low-voltage (VGL) wiring with a low voltage that is used for the control signal, and the second conductive layer 72A is electrically coupled to the first conductive layer 71 through contact holes formed in the fourth insulating film 14, the fifth insulating film 15, and the sixth insulating film 16. Although not illustrated in FIG. 8, the scan lines GL intersect with the first conductive layer 71 with the third insulating film 13 interposed therebetween as illustrated in FIG. 9.

As illustrated in FIG. 9, a shield layer CES is formed above the wiring region TA as a wiring group of the sensor wiring lines 51. The shield layer CES is provided above the fifth insulating film 15 and is covered by the sixth insulating film 16. A common potential that is applied to the detection electrodes DE in display is applied to the shield layer CES. The shield layer CES may be extended to a region obtained by enlarging the detection electrodes DE.

Figure 10:
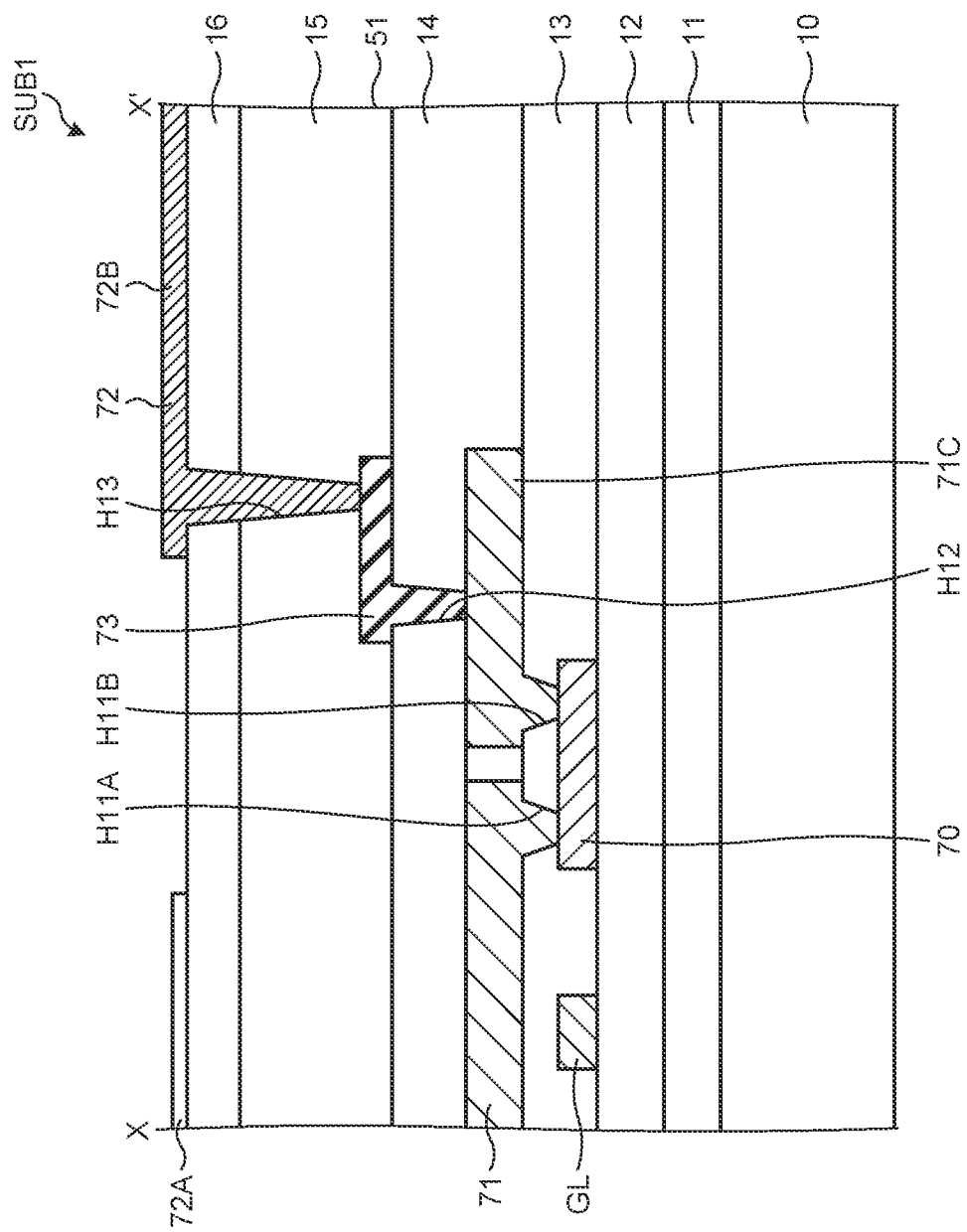
FIG. 10 is a cross-sectional view cut along line X-X' in FIG. 8.

FIG. 10 is a cross-sectional view cut along line X-X' in FIG. 8. The first conductive layer 71 is provided above the third insulating film 13. The first conductive layer 71 is a conductive layer for supplying the VGL potential. The first conductive layer 71 is formed in the same layer as the signal lines SL is and is made of the same material. The first conductive layer 71 is arranged in the gate driver 18 and extends along the second direction Dy.

The first conductive layer 71 is covered by the fourth insulating film 14. The first conductive layer 71 is coupled to a bridge portion 70 that is formed in the same layer as the scan lines GL is and is made of the same material through a contact hole H11A formed in the third insulating film 13 in the vicinity of a terminal portion of the gate driver 18.

A relay conductive layer 71C is formed in the same layer as the first conductive layer 71 and the signal lines SL are and is made of the same material. The relay conductive layer 71C is provided above the third insulating film 13. The relay conductive layer 71C is coupled to the bridge portion 70 through the contact hole H11A formed in the third insulating film 13. The relay conductive layer 71C is covered by the fourth insulating film 14.

A relay conductive layer 73 is provided above the fourth insulating film 14. The relay conductive layer 73 is formed in the same layer as the relay electrodes 65 and the sensor wiring lines 51 illustrated in FIG. 6 are, and is made of the same material. The relay conductive layer 73 is electrically coupled to the relay conductive layer 73 through a contact hole H12 in the fourth insulating film 14. The relay conductive layer 73 is covered by the fifth insulating film 15.

The second conductive layer 72A and the second conductive layer 72B are provided above the sixth insulating film 16. The second conductive layer 72A and the second conductive layer 72B are formed in the same layer as the pixel electrodes PE is and are made of the same material. The second conductive layer 72B is electrically coupled to the relay conductive layer 73 through a contact hole H13 formed in the fifth insulating film 15 and the sixth insulating film 16. With the above-mentioned configuration, the VGL potential with a low voltage that is used for the control signal is supplied to the second conductive layer 72A and the second conductive layer 72B.

In the example illustrated in FIG. 8, a second conductive layer 72 includes the second conductive layer 72A formed linearly along the first conductive layer 71 as the VGL wiring line coupled to the gate driver 18 just above the first conductive layer 71 and the second conductive layer 72B led out from the second conductive layer 72A to the display region DA side. The second conductive layer 72A may be expressed as a first portion 72A and a second portion 72B of the second conductive layer 72.

The second conductive layer 72A (first portion) and the second conductive layer 72B (second portion) may be integrally formed or may be electrically coupled using a plurality of relay conductive layers but be isolated from each other as illustrated in FIG. 10.

Figure 11:
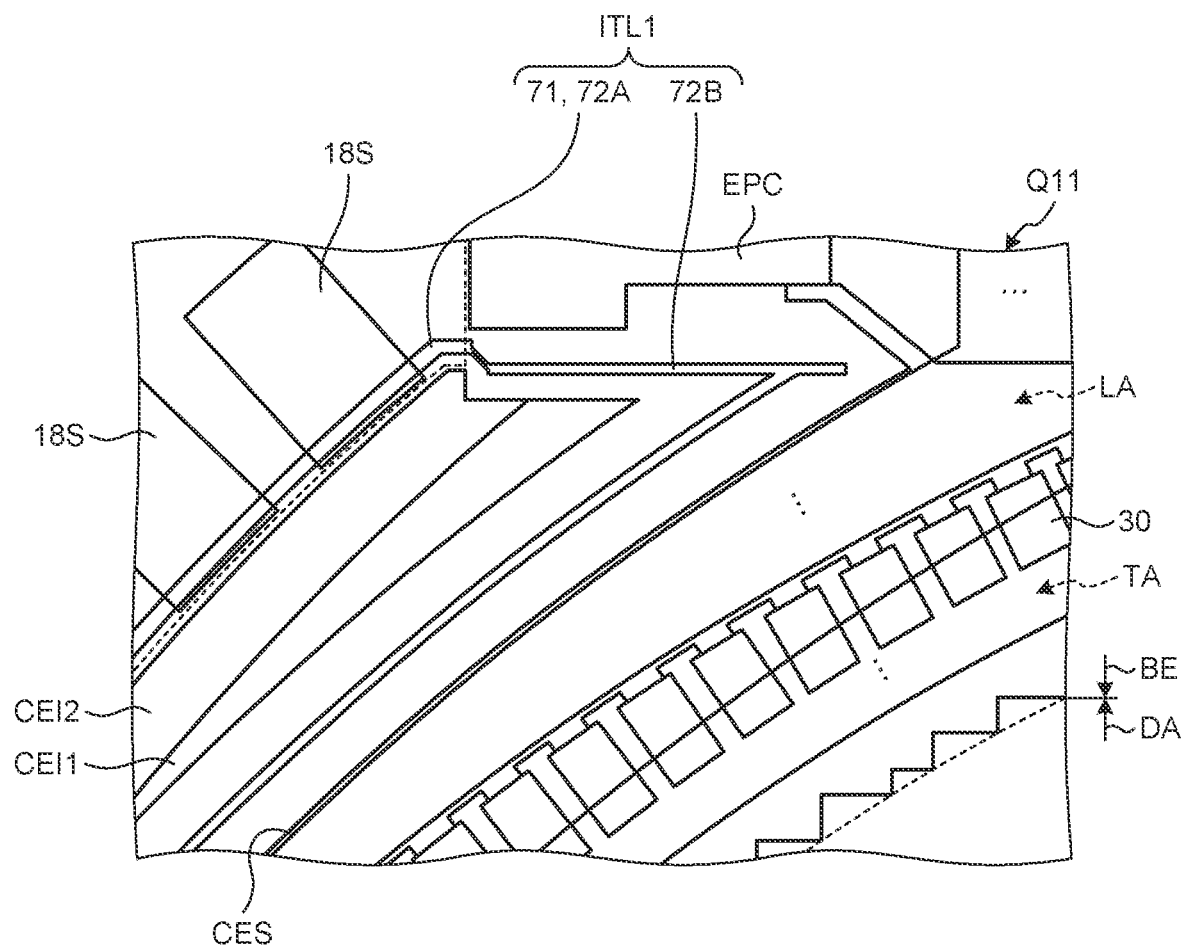
FIG. 11 is a partially enlarged view of a portion Q11 in FIG. 8.

FIG. 11 is a partially enlarged view of a portion Q11 in FIG. 8. As illustrated in FIG. 11, a statistic electricity protection circuit ESC is arranged in the extension direction of the first conductive layer 71 and the second conductive layer 72A. As illustrated in FIG. 8, the ion trap electrode ITL1 is folded back before the statistic electricity protection circuit EPC, and the ion trap electrode ITL1 is formed in a U shape when seen from above. To be more specific, the second conductive layer 72A of the ion trap electrode ITL1 extends linearly toward the statistic electricity protection circuit EPC arranged in the vicinity of the curved portion DAc along the first conductive layer 71. The second conductive layer 72B extends linearly toward the display region DA side before the statistic electricity protection circuit EPC. The second conductive layer 72B is further folded back in the second direction Dy before the wiring region LA and is formed in a U shape or a J shape when seen from above.

The above-mentioned shield layer CES is provided above the wiring region LA as a wiring group of the signal lines SL. The shield layer CES is provided above the fifth insulating film 15 and is covered by the sixth insulating film 16. As illustrated in FIG. 11, the second conductive layer 72B does not overlap with the shield layer CES when seen from above.

The shield layer CES is at a common potential differing from the VGL potential. As a distance between the gate driver 18 and the wiring region LA or the signal line coupling circuits 30 is increased, a distance between the gate driver 18 and the second conductive layer 72B in the first direction Dx is increased. In other words, as the distance between the gate driver 18 and the wiring region LA or the signal line coupling circuits 30 is increased, a distance between the second conductive layer 72A and the second conductive layer 72B in the first direction Dx is increased. On the other hand, the second conductive layer 72B extends along the edge of the shield layer CES, so that the ion impurities are easy to be retained between the second conductive layer 72B and the shield layer CES.

A region three sides of which are surrounded by the ion trap electrode ITL1 is formed between the gate driver 18 and the wiring region LA. An island-shaped shield layer CES1 is formed in this region. The shield layer CES1 is formed in the same layer as the shield layer CES is, is provided above the fifth insulating film 15, and is covered by the sixth insulating film 16. The common potential that is applied to the detection electrodes DE in display is applied to the shield layer CES1.

As illustrated in FIG. 11, the second conductive layer 72 does not overlap with the shield layer CES1 when seen from above. The width of the shield layer CES1 is increased as a distance between the first conductive layer 71 or the second conductive layer 72A and the second conductive layer 72B is increased. One side of the shield layer CES1 is thereby along the second conductive layer 72. The shield layer CES1 is at the common potential differing from the VGL potential and the second conductive layer 72 extends along the edge of the shield layer CES1, so that the ion impurities are easy to be retained between the second conductive layer 72 and the shield layer CES1.

A shield layer CES2 is formed on the first conductive layer 71 side or the second conductive layer 72A side of the shield layer CES1. The shield layer CES2 is a region three sides of which are surrounded by the ion trap electrode ITL1 and is provided at a position that does not overlap with the first conductive layer 71 and the second conductive layer 72. One side of the shield layer CES2 is along the first conductive layer 71 or the second conductive layer 72A. The shield layer CES2 is formed in the same layer as the pixel electrodes PE (see FIG. 3) is and is made of the same material. In other words, the shield layer CES2 is formed in the same layer as the second conductive layer 72 is and is made of the same material. A part of the shield layer CES2 is electrically coupled to the shield layer CES1 through a through hole formed in the sixth insulating film 16. The shield layer CES2 is therefore at the common potential.

The shield layer CES2 is at the common potential differing from the VGL potential and the first conductive layer 71 extends along the edge of the shield layer CES2, so that the ion impurities are easy to be retained between the first conductive layer 71 and the shield layer CES2. Furthermore, the shield layer CES2 makes contact with the first orientation layer AL1 to reinforce adhesion between the first orientation layer AL1 and the sixth insulating film 16 in the curved portion DAc, thereby preventing stripping of the orientation film.

The ion impurities are easy to be retained between the second conductive layer 72B and the shield layer CES and between the second conductive layer 72A and the shield layer CES1 and the shield layer CES2. As a result, even when the distance between the gate driver 18 and the wiring region LA is increased, the ionic impurities gathering around the curved portion DAc can be prevented from entering the liquid crystal layer LC in the display region DA.

Figure 12:
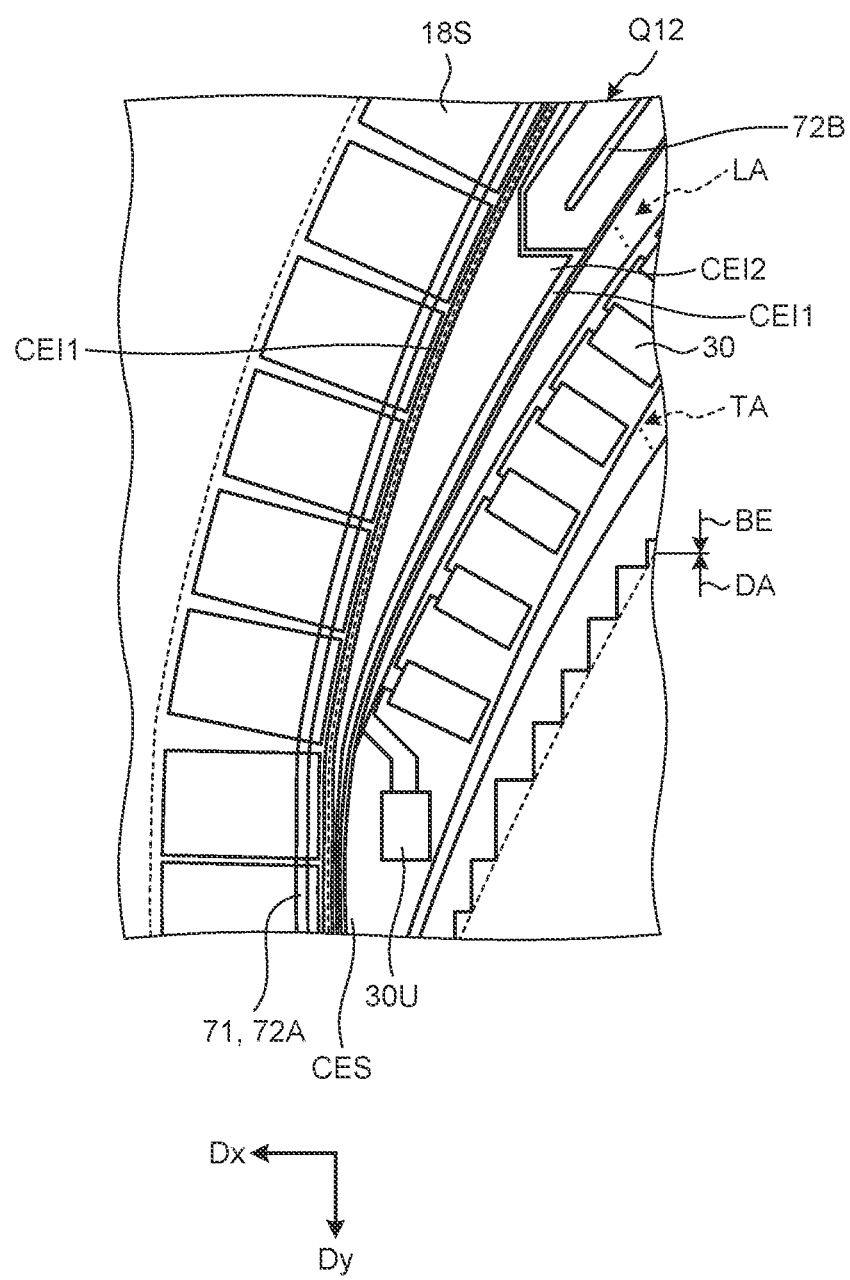
FIG. 12 is a partially enlarged view of a portion Q12 in FIG. 8.

FIG. 12 is a partially enlarged view of a portion Q12 in FIG. 8. The distance between the gate driver 18 and the wiring region LA in the portion Q12 in FIG. 8 is smaller than that in the portion Q11 in FIG. 8. The second conductive layer 72B extending to the portion Q12 in FIG. 8 from the portion Q11 in FIG. 8 is interrupted as illustrated in FIG. 12.

The width of the shield layer CES2 in a region with no second conductive layer 72B is larger than that in a region with the second conductive layer 72B between the gate driver 18 and the wiring region LA. The width of the shield layer CES2 varies in accordance with the distance between the gate driver 18 and the wiring region LA in the region with no second conductive layer 72B. That is to say, the width of the shield layer CES2 is decreased as the distance between the gate driver 18 and the wiring region LA is decreased.

When the distance between the gate driver 18 and the wiring region LA is decreased, the shield layer CES1 is not formed, and only the shield layer CES2 extends along the first conductive layer 71. The ionic impurities are easy to be retained between the second conductive layer 72 and the shield layer CES2 in the region with no shield layer CES1 between the gate driver 18 and the wiring region LA.

The shield layer CES1 and the shield layer CES2 have characteristics that the widths thereof are increased or decreased so as to fill the region surrounded by the ion trap electrode ITL1 in the vicinity of the curved portion DAc.

The display device 1 in the first embodiment includes the display region DA in which the pixels PX or subpixels SPX are provided on the array substrate SUB1 and that has the first side sDA1, the second side sDA2, the third side sDA3, the fourth side sDA4, and the curved portions DAc, and the peripheral region BE located between the first side 10s1 of the array substrate SUB1 and the display region DA. The signal line coupling circuits 30 coupled to the signal lines SL, the terminals T1 aligned in the peripheral region BE, and the wiring lines 53 coupling the terminals T1 and the signal line coupling circuits 30 are provided in the peripheral region BE. The ion trap electrode ITL1 to which the fixed VGL potential is to be applied is provided between the gate driver 18 and the wiring region LA in which the wiring lines 53 are arranged around at least one curved portion DAc.

The ionic impurities can thereby be retained in the peripheral region BE outside the display region for the curved portion DAc of the display region DA having a partially curved shape.

As illustrated in FIG. 12, a signal line coupling circuit 30U at the end of the curved portion DAc is different from the other signal line coupling circuits 30 in the long side direction of the occupying area of the rectangle. The long side direction of the occupying area of the rectangle in the signal line coupling circuit 30U is made along the second direction Dy. The size of the curved portion DAc can thereby be reduced.

Second Embodiment

Figure 13:
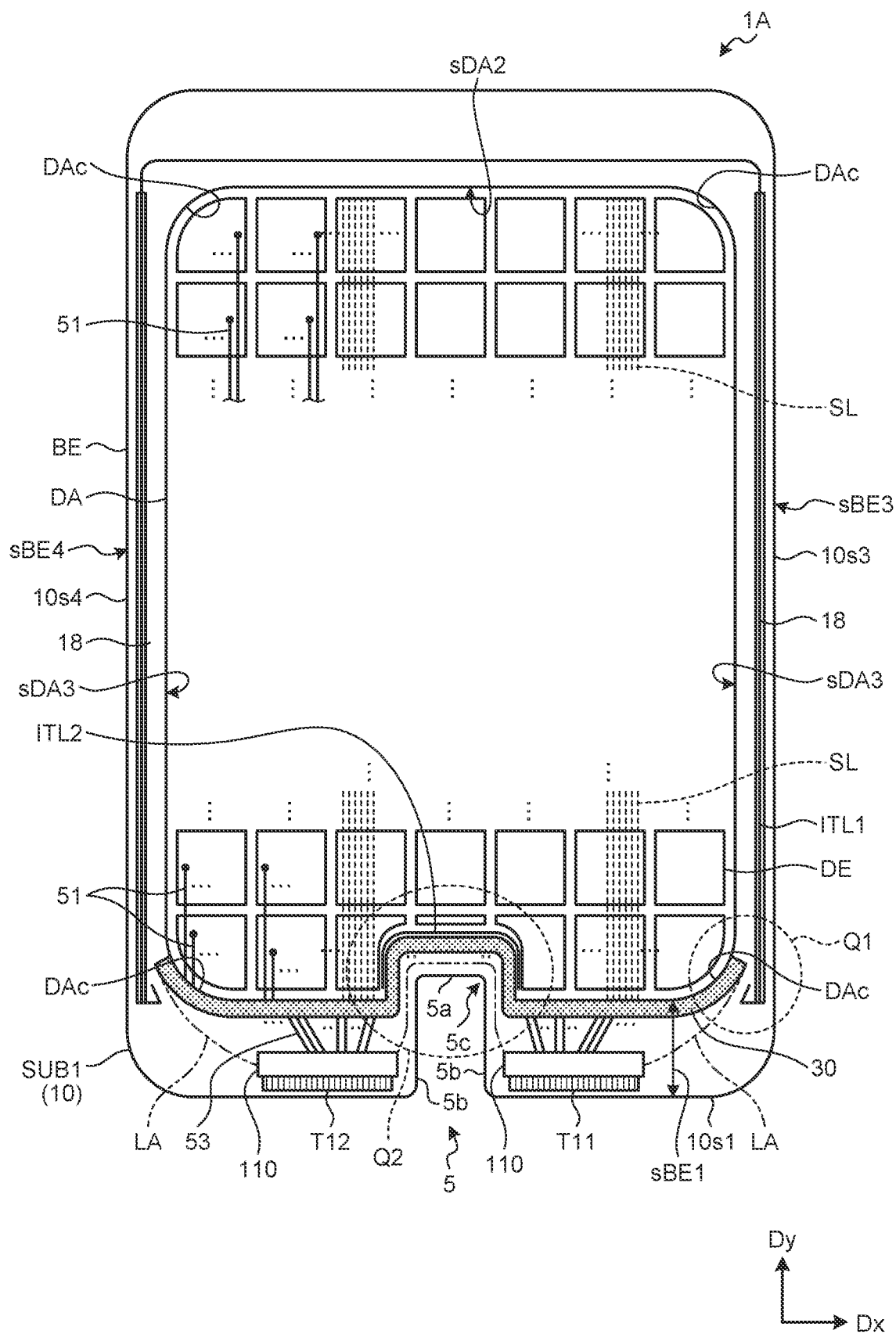
FIG. 13 is a plan view schematically illustrating an array substrate in a second embodiment.
Figure 14:
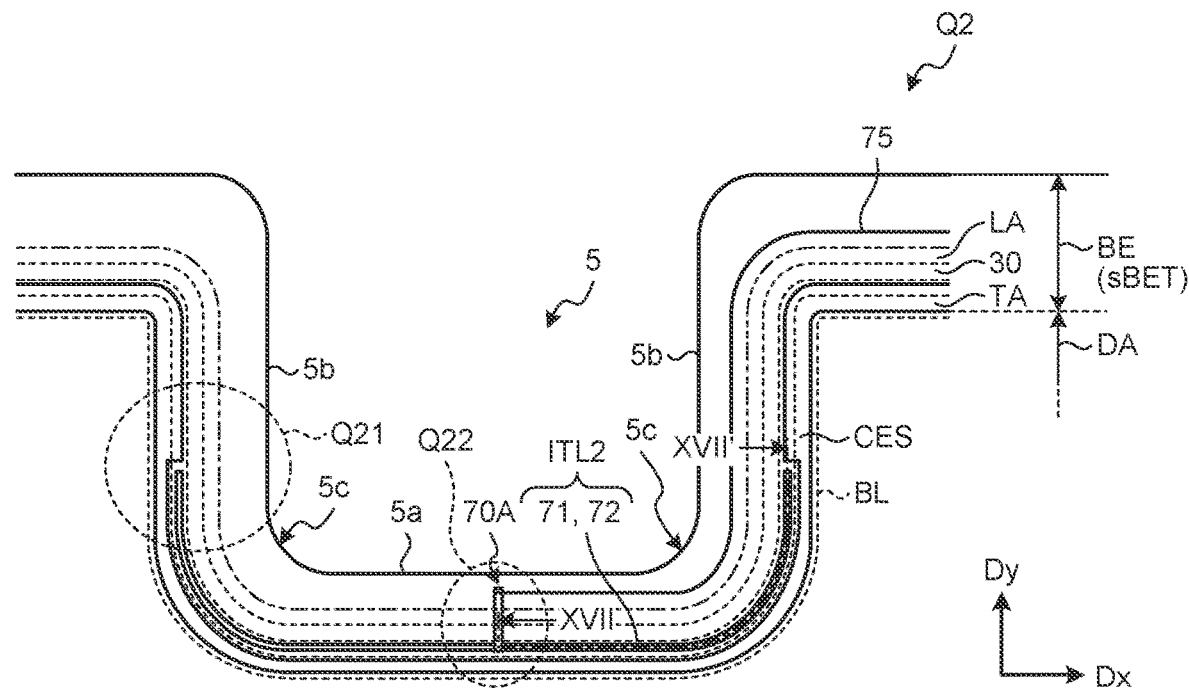
FIG. 14 is a plan view illustrating an ion trap electrode arranged so as to be adjacent to a notch portion formed by cutting a display region.
Figure 15:
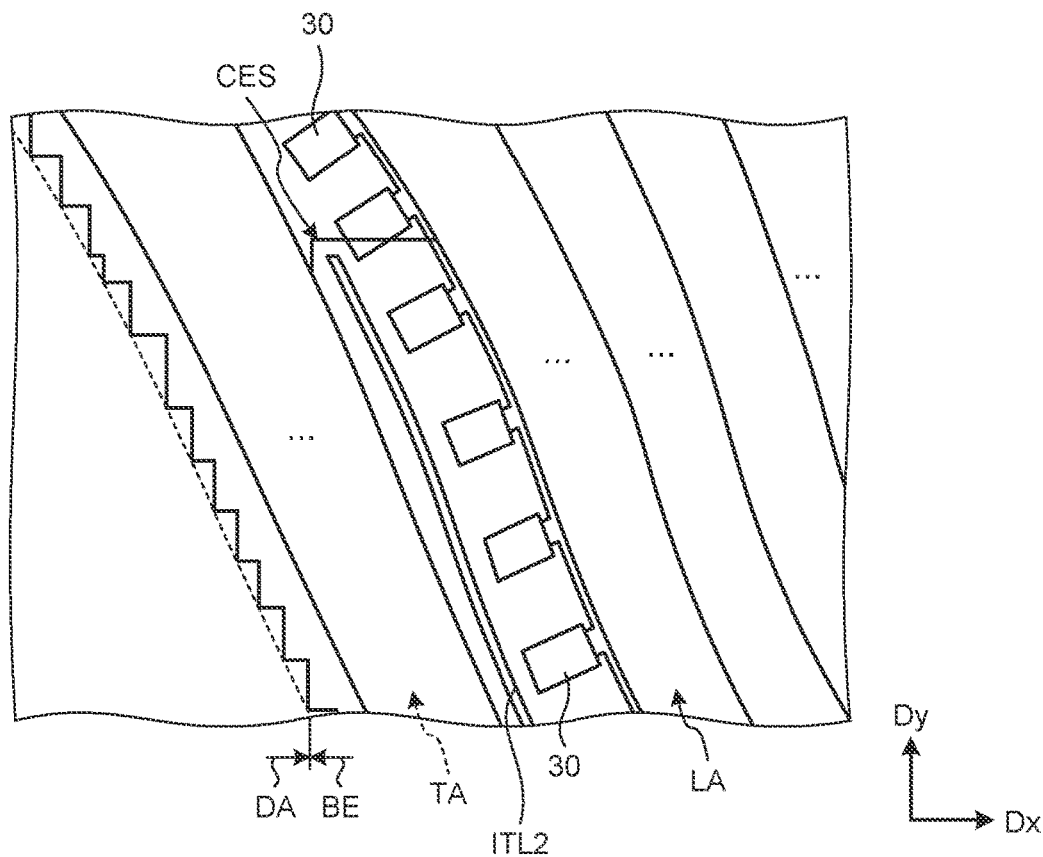
FIG. 15 is a partially enlarged view of a portion Q21 in FIG. 14.
Figure 16:
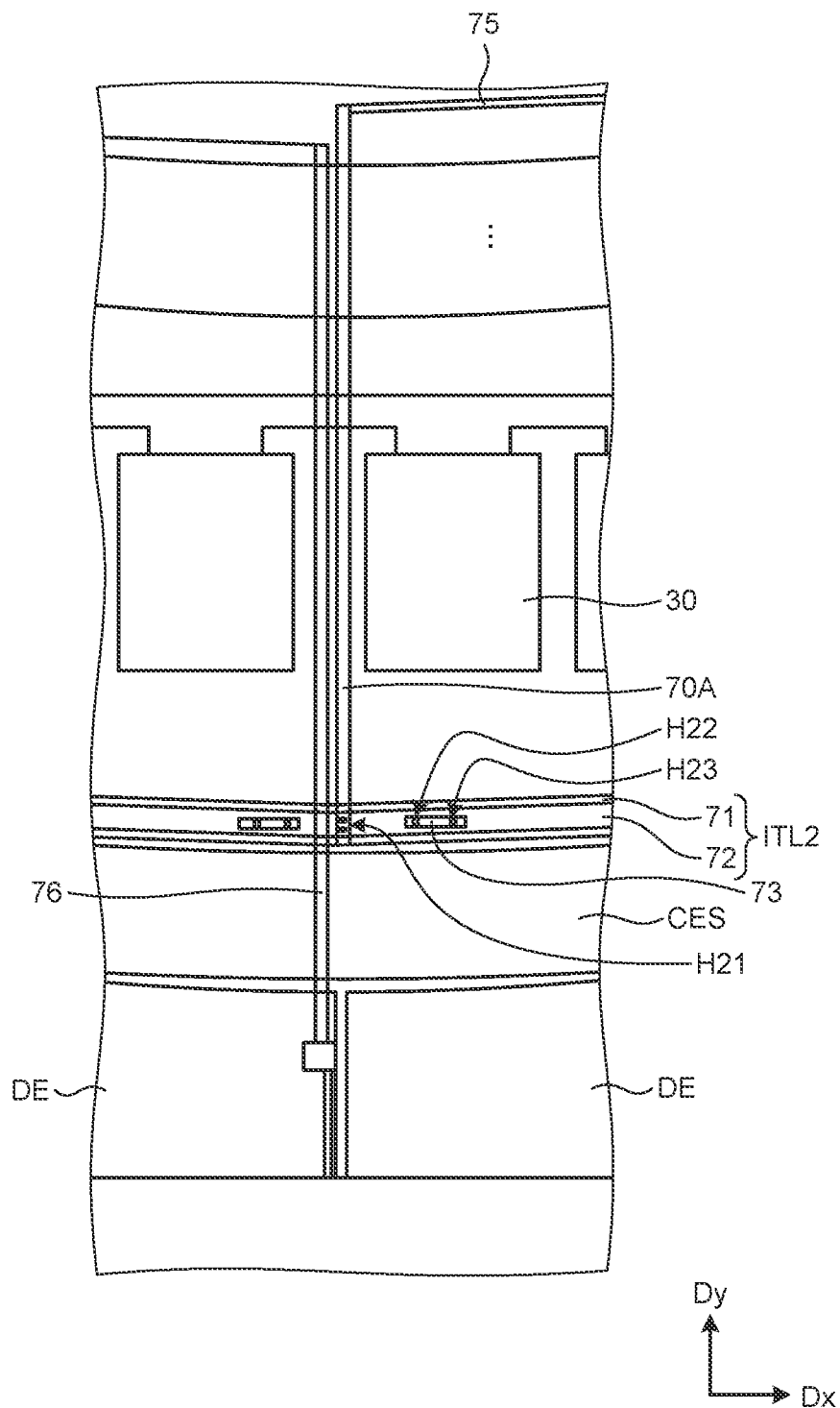
FIG. 16 is a partially enlarged view of a portion Q22 in FIG. 14.
Figure 17:
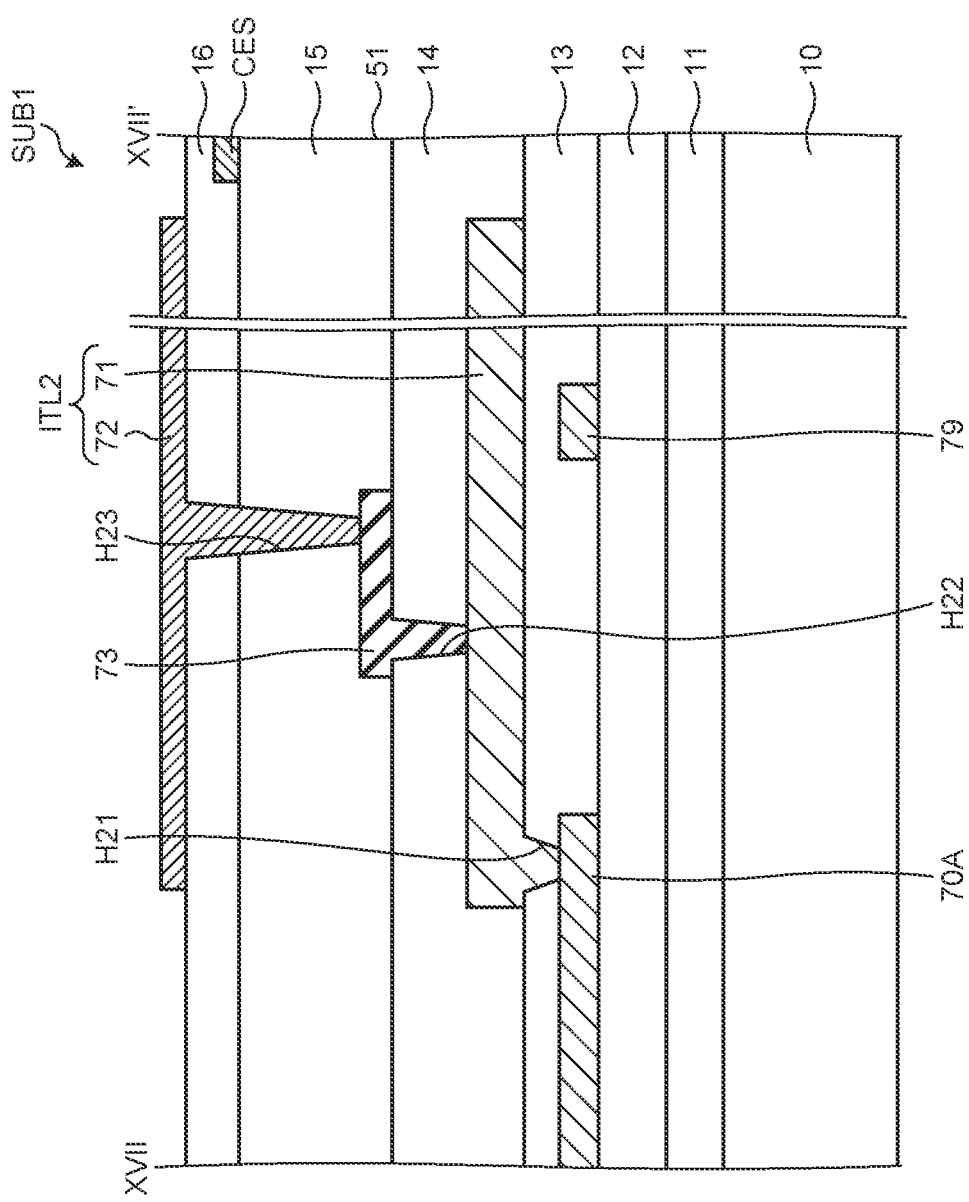
FIG. 17 is a cross-sectional view cut along line XVII-XVII' in FIG. 14.

FIG. 13 is a plan view schematically illustrating an array substrate in a second embodiment. FIG. 14 is a plan view illustrating an ion trap electrode arranged so as to be adjacent to a notch portion formed by cutting a display region. FIG. 15 is a partially enlarged view of a portion Q21 in FIG. 14. FIG. 16 is a partially enlarged view of a portion Q22 in FIG. 14. FIG. 17 is a cross-sectional view cut along line XVII-XVII' in FIG. 14. FIG. 18 is a plan view illustrating the ion trap electrode in the second embodiment. The same reference numerals denote the same components as those described in the first embodiment, and overlapped explanation thereof is omitted. A display device 1A in the second embodiment also includes an ion trap electrode ITL2 also in a region Q2 corresponding to a notch portion 5 in addition to the region Q1 in the first embodiment. Hereinafter, details of the ion trap electrode ITL2 are described.

In the display device 1A in the second embodiment, the first insulating substrate 10 has the notch portion 5 cut out toward the display region DA from the first side 10s1. The notch portion 5 is also referred to as a recess. The notch portion 5 has a fifth side 5a, sixth sides 5b, and corner portions 5c. The fifth side 5a is parallel with the first direction Dx. The sixth sides 5b are parallel with the second direction Dy and two sixth sides 5b are aligned in the first direction Dx. The corner portions 5c couple the fifth side 5a and the sixth sides 5b. The corner portions 5c are curved lines.

A position at which the notch portion 5 is provided is not limited to the first side 10s1 and the notch portion 5 may be formed in the second side 10s2.

A shape of the notch portion 5 may be such a shape that two corner portions 5c are continuous to each other without forming the fifth side 5a and the sixth sides 5b. Alternatively, the shape of the notch portion 5 may be such a shape that two corner portions 5c are continuous to each other and the sixth sides 5b are formed without forming the fifth side 5a.

The detection electrodes DE adjacent to the notch portion 5 have different shapes and sizes (areas) from those of the rectangular detection electrodes DE. Although not illustrated in FIG. 13, the counter substrate SUB2 (see FIG. 2) does not also have a rectangular shape but an irregular shape when seen from above. For example, the outer circumference of the counter substrate SUB2 has corner portions with curved lines and a recess provided so as to correspond to the notch portion 5.

A first terminal T11, a second terminal T12, the wiring region LA, and the signal line coupling circuits 30 are provided in the first partial peripheral region sBE1. The notch portion 5 is located between the first terminal T11 and the second terminal T12. The driver ICs 110 are mounted on the first terminal T11 and the second terminal T12, and what is called a COG structure is established in the second embodiment.

Next, details of the configuration of the ion trap electrode ITL2 in the second embodiment are described. As illustrated in FIG. 14, the wiring region TA including the sensor wiring lines 51 (see FIG. 5) is formed on the outer side of the display region DA in the region Q2.

An arrangement region of the signal line coupling circuits 30 is formed on the outer side of the wiring region TA. The wiring region LA is formed on the outer side of the arrangement region of the signal line coupling circuits 30.

The ion trap electrode ITL2 is arranged between the display region DA and the arrangement region of the signal line coupling circuits 30. The ion trap electrode ITL2 includes the first conductive layer 71 and the second conductive layer 72.

As illustrated in FIG. 14 and FIG. 16, a VGL potential is supplied to a VGL wiring line 70A through a control line 75 from the driver ICs 110.

As illustrated in FIG. 14, the first conductive layer 71 is arranged at a position that does not overlap with the wiring region TA in which the sensor wiring lines 51 are arranged when seen from above. The VGL potential of the first conductive layer 71 thereby gives less influence on the sensor wiring lines 51.

As illustrated in FIG. 14 and FIG. 15, the shield layer CES is formed above the wiring region TA. As illustrated in FIG. 17, the shield layer CES is provided above the fifth insulating film 15 and is covered by the sixth insulating film 16. The second conductive layer 72 does not overlap with the shield layer CES when seen from above. A common potential that is applied to the detection electrodes DE in display is applied to the shield layer CES. The shield layer CES may be extended to a region obtained by enlarging the detection electrodes DE.

As illustrated in FIG. 16, wiring lines 76 are formed in the same layer as the scan lines GL are and are made of the same material. The wiring lines 76 are coupled to the detection electrodes DE and are at the common potential in a display period. Touch drive signals for detection are supplied to the wiring lines 76 in a touch detection period.

As illustrated in FIG. 17, the VGL wiring line 70A is provided above the second insulating film 12. The VGL wiring line 70A is a conductive layer for supplying the VGL potential with a low voltage that is used for the control signal. The VGL wiring line 70A is formed in the same layer as the scan lines GL are and is made of the same material.

The VGL wiring line 70A is covered by the third insulating film 13. As illustrated in FIG. 17, the first conductive layer 71 is electrically coupled to the VGL wiring line 70A through a contact hole H21 (see FIG. 16) in the third insulating film 13.

The first conductive layer 71 is provided above the third insulating film 13. The relay conductive layer 73 is provided above the fourth insulating film 14. The relay conductive layer 73 is formed in the same layer as the relay electrodes 65 and the sensor wiring lines 51 illustrated in FIG. 6 are, and is made of the same material.

As illustrated in FIG. 17, the first conductive layer 71 is covered by the fourth insulating film 14. The relay conductive layer 73 is electrically coupled to the first conductive layer 71 through a contact hole H22 (see FIG. 16) in the fourth insulating film 14.

As illustrated in FIG. 17, the second conductive layer 72 is provided above the sixth insulating film 16. The second conductive layer 72 is formed in the same layer as the pixel electrodes PE are and is made of the same material. As illustrated in FIG. 17, the second conductive layer 72 is electrically coupled to the relay conductive layer 73 through a contact hole H23 (see FIG. 16) formed in the fifth insulating film 15 and the sixth insulating film 16. With the above-mentioned configuration, the VGL potential with a low voltage that is used for the control signal is supplied to the second conductive layer 72.

The display device 1A in the second embodiment includes the display region DA in which the pixels PX or subpixels SPX are provided on the array substrate SUB1 and that has the first side sDA1, the second side sDA2, the third side sDA3, the fourth side sDA4, and the curved portions DAc, and the peripheral region BE located between the first side 10s1 of the array substrate SUB1 and the display region DA. The signal line coupling circuits 30 coupled to the signal lines SL and the first terminal T11 and the second terminal T12 (terminals) aligned in the peripheral region BE are provided in the peripheral region BE. The notch portion 5 of the display region DA is provided in the first side sDA1 adjacent to the first terminal T11 and the second terminal T12 (terminals). The signal line coupling circuits 30 are arranged along the first side sDA1 and the notch portion 5. The ion trap electrode ITL2 to which the fixed VGL potential is to be applied is provided between the display region DA and the signal line coupling circuits 30 in the notch portion 5 in the region Q2.

The ionic impurities can thereby be retained in the peripheral region BE outside the display region for the notch portion 5 of the display region DA having a partially curved shape.

The ion trap electrode ITL2 is arranged between the wiring region TA and the signal line coupling circuits 30 in the notch portion 5. As illustrated in FIG. 17, interlayer control lines 79 intersecting with the ion trap electrode ITL2 with the third insulating film 13 interposed therebetween are arranged. The interlayer control lines 79 are electrically coupled to the signal lines SL illustrated in FIG. 13, for example. As illustrated in FIG. 18, the interlayer control lines 79 intersect with the ion trap electrode ITL2 when seen from above.

The second conductive layer 72 is made of a conductive material having translucency, such as ITO and IZO. Since the second conductive layer 72 is fixed at the VGL potential, the edge of the second conductive layer 72 can be electrolytically corroded when the second conductive layer 72 intersects with the interlayer control lines 79 with a different potential as illustrated in FIG. 18. When the second conductive layer 72 is disconnected due to progress of electrolytic corrosion, the ionic impurities gathering around the notch portion 5 can enter the liquid crystal layer LC in the display region DA.

To cope with this, the shield layer CES is at the common potential differing from the VGL potential. The ion trap electrode ITL2 extends along the edge of the shield layer CES, so that the ion impurities are easy to be retained between the ion trap electrode ITL2 and the shield layer CES.

The ion trap electrode ITL2 includes the first conductive layer 71 provided in the same layer as the signal lines SL are and the second conductive layer 72 that is electrically coupled to the first conductive layer 71 and is provided above the first conductive layer 71 with the fourth insulating film 14, the fifth insulating film 15, and the sixth insulating film 16 interposed therebetween. The second conductive layer 72 overlaps with the first conductive layer 71. In the second embodiment, the second conductive layer 72 and the first conductive layer 71 overlap with each other when seen from above, as illustrated in FIG. 18. A width W11 of the first conductive layer 71 in the second direction Dy is larger than a width W12 of the second conductive layer 72 in the second direction Dy. The first conductive layer 71 is formed by a metal layer made of aluminum or the like. The possibility that the edge of the second conductive layer 72 is electrolytically corroded can thereby be reduced. This can reduce the possibility that the second conductive layer 72 is disconnected. As a result, the possibility that the ionic impurities gathering around the notch portion 5 enter the liquid crystal layer LC in the display region DA can be reduced.

Although the preferred embodiments of the present disclosure have been described above, the present disclosure is not limited by the embodiments. Contents disclosed in the embodiments are merely examples, and various modifications can be made in a range without departing from the gist of the present disclosure. It is needless to say that appropriate modifications in a range without departing from the gist of the present disclosure belong to the technical range of the present disclosure. At least one of various omission, replacement, and modification of the components can be performed in a range without departing from the gist of the embodiments and modifications described above.

For example, the ion trap electrode described in JP-A-2018-036465 may be provided in the above-mentioned first side sDA1 in the wiring region LA. The above-mentioned first embodiment and second embodiment encompass modes in which the ion trap electrode in JP-A-2018-036465 is included and the ion trap electrode is arranged in the first side sDA1, the second side sDA2, the third side sDA3, the fourth side sDA4, the curved portion DAc, and the notch portion 5.

Although a plane defined by the first direction Dx and the second direction Dy is parallel with a plane of the array substrate SUB1, the plane of the array substrate SUB1 may be curved. In this case, a predetermined direction when seen from a direction in which the display device 1 or 1A has the maximum area is a first direction, and a direction intersecting with the first direction is a second direction. It is sufficient that a third direction orthogonal to the first direction and the second direction is defined as the direction in which the display device 1 has the maximum area.

What is claimed is:

1. A display device comprising:
a substrate;
a display region in which a plurality of pixels are provided on the substrate and that has a first side, a second side, a third side, a fourth side, and a plurality of curved portions;
a peripheral region located between an end portion of the substrate and the display region;
a plurality of scan lines extending in a first direction;
a plurality of signal lines extending in a second direction;
at least one gate driver arranged in the peripheral region and coupled to the scan lines;
a signal line coupling circuit arranged in the peripheral region and coupled to the signal lines;
a plurality of terminals aligned in the peripheral region; and
a plurality of wiring lines coupling the terminals and the signal line coupling circuit, wherein
an ion trap electrode to which a fixed potential is to be applied is provided between the gate driver and a wiring region in which the wiring lines are arranged around at least one of the curved portions.

2. The display device according to claim 1, wherein the ion trap electrode has a U shape when seen from above between the gate driver and the wiring region.

3. The display device according to claim 1, wherein
the third side faces the fourth side, and the second side faces the first side, and
the ion trap electrode extends and is continuously coupled so as to be along the third side, the second side, and the fourth side.

4. The display device according to claim 3, wherein
a plurality of the gate drivers are provided, and the gate drivers are respectively arranged along the third side and the fourth side, and
the ion trap electrode is arranged between one of the gate drivers and the third side and between the other of the gate drivers and the fourth side.

5. The display device according to claim 1, wherein
the ion trap electrode includes
a first conductive layer provided in the same layer as the signal lines and
a second conductive layer that is electrically coupled to the first conductive layer and is provided above the first conductive layer with an insulating film interposed therebetween, and
as a distance between the gate driver and the wiring region is increased, a distance between the gate driver and the second conductive layer in the first direction is increased.

6. The display device according to claim 5, wherein
the scan lines, the signal lines, a plurality of sensor wiring lines, a plurality of first electrodes, and a plurality of second electrodes are stacked in order with insulating films interposed therebetween in the display region,
the sensor wiring lines electrically couple the terminals and the first electrodes,
the second electrodes are partitioned by the respective pixels, and
the second conductive layer is provided in the same layer as the second electrodes.

7. A display device comprising:
a substrate;
a display region in which a plurality of pixels are provided on the substrate and that has a first side, a second side, a third side, and a fourth side;
a peripheral region located between an end portion of the substrate and the display region;
a plurality of scan lines extending in a first direction;
a plurality of signal lines extending in a second direction;
a signal line coupling circuit arranged in the peripheral region and coupled to the signal lines; and a plurality of terminals aligned in the peripheral region, wherein a notch portion of the display region is provided in the first side adjacent to the terminals, the signal line coupling circuit is arranged along the first side and the notch portion, and an ion trap electrode to which a fixed potential is to be applied is provided between the display region and the signal line coupling circuit in the notch portion.

8. The display device according to claim 7, wherein the scan lines, the signal lines, a plurality of sensor wiring lines, a plurality of first electrodes, and a plurality of second electrodes are stacked in order with insulating films interposed therebetween in the display region, the sensor wiring lines electrically couple the terminals and the first electrodes, the second electrodes are partitioned by the respective pixels, and a wiring region in which the sensor wiring lines led out to the peripheral region are arranged and the ion trap electrode do not overlap with each other when seen from above.

9. The display device according to claim 8, further comprising a shield layer provided in the same layer as the first electrodes and covering the peripheral region including the wiring region, wherein the ion trap electrode does not overlap with the shield layer when seen from above.

10. The display device according to claim 7, wherein the ion trap electrode includes a first conductive layer provided in the same layer as the signal lines and a second conductive layer that is electrically coupled to the first conductive layer and is provided above the first conductive layer with an insulating film therebetween, and the second conductive layer overlaps with the first conductive layer.

11. The display device according to claim 10, wherein a width of the first conductive layer is larger than a width of the second conductive layer.

12. The display device according to claim 10, wherein the scan lines, the signal lines, a plurality of first electrodes, and a plurality of second electrodes are stacked in order with insulating films interposed therebetween in the display region on the substrate, the first conductive layer is provided in the same layer as the signal lines, and the second conductive layer is provided in the same layer as the second electrodes.

* * * * *